US012745046B2

(12) United States Patent
Yamamoto

(10) Patent No.: US 12,745,046 B2
(45) Date of Patent: Sep. 22, 2026

(54) ULTRASONIC TRANSDUCER AND PARAMETRIC SPEAKER INCLUDING THE SAME

(71) Applicant: Murata Manufacturing Co., Ltd., Nagaokakyo (JP)

(72) Inventor: Hironari Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 171 days.

(21) Appl. No.: 18/953,201

(22) Filed: Nov. 20, 2024

(65) Prior Publication Data

US 2025/0175745 A1 May 29, 2025

Related U.S. Application Data

(63) Continuation of application No. PCT/JP2024/019651, filed on May 29, 2024.

(30) Foreign Application Priority Data

Nov. 27, 2023 (JP) ................................ 2023-199596

(51) Int. Cl.
*H04R 17/10* (2006.01)
*H04R 7/04* (2006.01)
*H04R 7/18* (2006.01)

(52) U.S. Cl.
CPC ............... *H04R 17/10* (2013.01); *H04R 7/04* (2013.01); *H04R 7/18* (2013.01); *H04R 2307/027* (2013.01); *H04R 2400/11* (2013.01)

(58) Field of Classification Search
CPC . H04R 17/10; H04R 7/04; H04R 7/18; H04R 2307/027; H04R 2400/11;
(Continued)

(56) References Cited

U.S. PATENT DOCUMENTS

2013/0307633 A1* 11/2013 Onishi .................. H04R 17/00 331/155
2016/0107194 A1* 4/2016 Panchawagh ......... B06B 1/0207 310/317
(Continued)

FOREIGN PATENT DOCUMENTS

CN 115103280 A 9/2022
JP 2003047085 A 2/2003
(Continued)

OTHER PUBLICATIONS

Official Communication in PCT/JP2024/019651, mailed Jul. 30, 2024, 8 pages.

*Primary Examiner* — Vivian C Chin
*Assistant Examiner* — Shin Lee
(74) *Attorney, Agent, or Firm* — Keating & Bennett, LLP

(57) ABSTRACT

A first diaphragm resonantly vibrates in a phase opposite to a phase of a unimorph piezoelectric vibrator in a direction orthogonal to the first diaphragm. A dimension in a longitudinal direction inside at least one frame body is four or more times a dimension in a lateral direction orthogonal to the longitudinal direction inside the at least one frame body. A second diaphragm is located in a region between both edges in the lateral direction of an inner peripheral surface of the at least one frame body as viewed in the direction orthogonal to the first diaphragm, and average distances in the lateral direction between edges in the lateral direction of the inner peripheral surface of the at least one frame body and edges in the lateral direction of the second diaphragm are one sixth or less the dimension in the lateral direction inside the at least one frame body.

20 Claims, 17 Drawing Sheets

(58) Field of Classification Search
CPC .... H04R 2217/03; H04R 1/403; H04R 17/00; H04R 3/00; B06B 2201/55; B81B 2201/032
See application file for complete search history.

(56) References Cited

U.S. PATENT DOCUMENTS

| | | | | |
|---|---|---|---|---|
| 2019/0081711 | A1 | 3/2019 | Yoshida | |
| 2022/0169497 | A1 | 6/2022 | Savoia et al. | |
| 2023/0347381 | A1* | 11/2023 | Van Neer | B06B 1/0292 |

FOREIGN PATENT DOCUMENTS

| | | | |
|---|---|---|---|
| JP | 6333480 | B1 | 5/2018 |
| WO | 2012090383 | A1 | 7/2012 |

* cited by examiner

ULTRASONIC TRANSDUCER AND PARAMETRIC SPEAKER INCLUDING THE SAME

CROSS REFERENCE TO RELATED APPLICATIONS

This application claims the benefit of priority to Japanese Patent Application No. 2023-199596 filed on Nov. 27, 2023 and is a Continuation application of PCT Application No. PCT/JP2024/019651 filed on May 29, 2024. The entire contents of each application are hereby incorporated herein by reference.

BACKGROUND OF THE INVENTION

1. Field of the Invention

The present invention relates to ultrasonic transducers and parametric speakers each including an ultrasonic transducer.

2. Description of the Related Art

Japanese Unexamined Patent Application Publication No. 2003-47085 and Japanese Patent No. 6333480 are prior art documents that have disclosed the structure of a superdirective acoustic device. The superdirective acoustic device described in Japanese Unexamined Patent Application Publication No. 2003-47085 includes a plurality of ultrasonic vibrators provided on a single printed circuit board, and the plurality of ultrasonic vibrators are disposed such that the outer periphery thereof forms a substantially circular shape. The plurality of ultrasonic vibrators are divided into two groups having different installation heights.

The superdirective acoustic device described in Japanese Patent No. 6333480 includes a first ultrasonic wave emitter and a second ultrasonic wave emitter. The second ultrasonic wave emitter is disposed on the axis of the first ultrasonic wave emitter and in front of the radiation surface of the first ultrasonic wave emitter. The phase of a carrier signal emitted by the second ultrasonic wave emitter is opposite to the phase of a carrier signal contained in a signal emitted by the first ultrasonic wave emitter.

In the superdirective acoustic device described in Japanese Unexamined Patent Application Publication No. 2003-47085, since the plurality of ultrasonic vibrators in two groups having different installation heights are provided, the structure is complex. In the superdirective acoustic device described in Japanese Patent No. 6333480, since the second ultrasonic wave emitter is disposed outside the first ultrasonic wave emitter, the device becomes larger.

SUMMARY OF THE INVENTION

Example embodiments of the present invention provide ultrasonic transducers each with a simple and small-sized structure that are able to increase the acoustic pressure level, and parametric speakers each including such ultrasonic transducers.

An ultrasonic transducer according to an example embodiment of the present invention includes a first diaphragm, at least one frame body, and at least one unimorph piezoelectric vibrator. The at least one frame body extends in a longitudinal direction and is joined to the first diaphragm. The at least one unimorph piezoelectric vibrator is attached to the at least one frame body. The at least one unimorph piezoelectric vibrator includes a piezoelectric body facing the first diaphragm with a space therebetween and a second diaphragm on an opposite side of the piezoelectric body from the frame body. The first diaphragm resonantly vibrates in a phase opposite to a phase of the at least one unimorph piezoelectric vibrator in a direction orthogonal or substantially orthogonal to the first diaphragm 1. A dimension in the longitudinal direction inside the at least one frame body is about four or more times a dimension in a lateral direction orthogonal or substantially orthogonal to the longitudinal direction inside the at least one frame body. The second diaphragm is located in a region interposed, in the lateral direction, between both edges in the lateral direction of an inner peripheral surface of the at least one frame body as viewed in the direction orthogonal or substantially orthogonal to the first diaphragm. In the second diaphragm, an average distance in the lateral direction between one of the edges in the lateral direction of the inner peripheral surface of the at least one frame body and one of edges in the lateral direction of the second diaphragm and an average distance in the lateral direction between another of the edges in the lateral direction of the inner peripheral surface of the at least one frame body and another of the edges in the lateral direction of the second diaphragm are one sixth or less the dimension in the lateral direction inside the at least one frame body.

According to example embodiments of the present invention, an acoustic pressure level can be increased by an ultrasonic transducer with a simple and small-sized structure.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
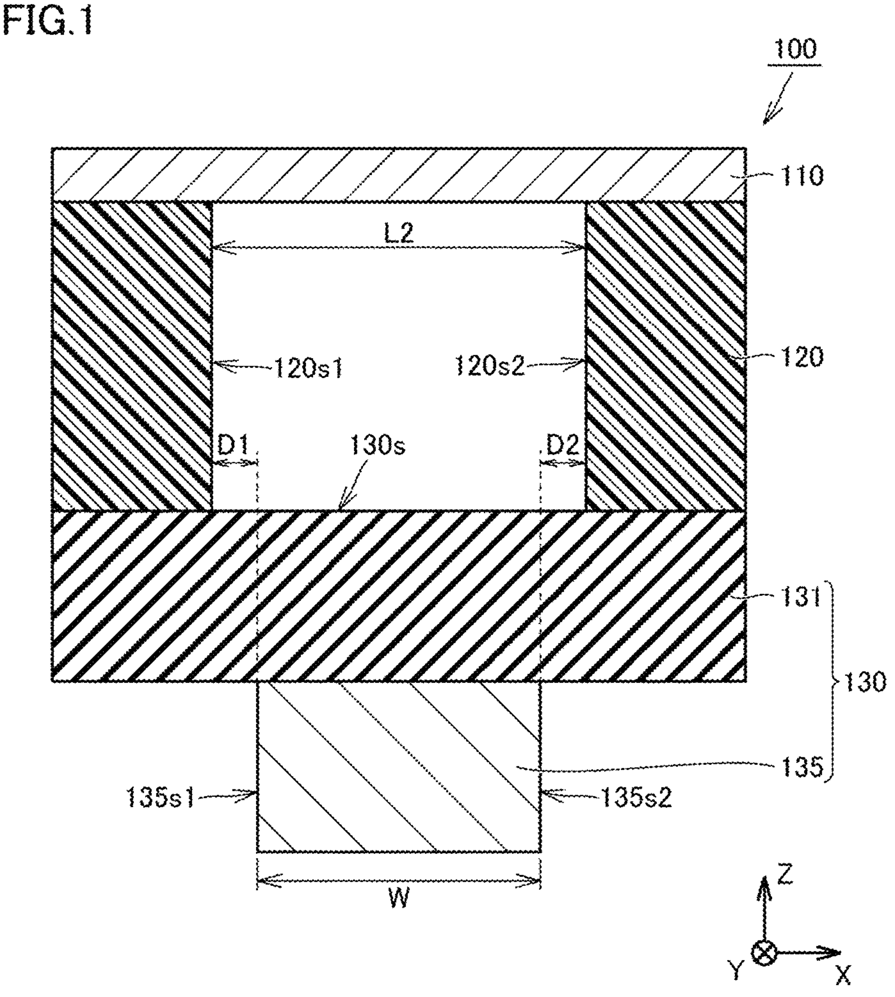
FIG. 1 is a vertical sectional view illustrating the structure of an ultrasonic transducer according to example embodiment 1 of the present invention.

Ultrasonic transducers according to example embodiments of the present invention will be described with reference to the drawings. In the following description of the example embodiments, the same or corresponding components in the drawings are denoted by the same reference numerals to omit the description thereof. The present invention is applicable to applications that require high-acoustic-pressure ultrasonic waves, such as, for example, ultrasonic transducers for parametric speakers, ultrasonic sensors, or non-contact haptics. An ultrasonic transducer for parametric speakers will be described as an example in the following example embodiments, but the application of the ultrasonic transducer is not limited to this.

Example Embodiment 1

Figure 2:
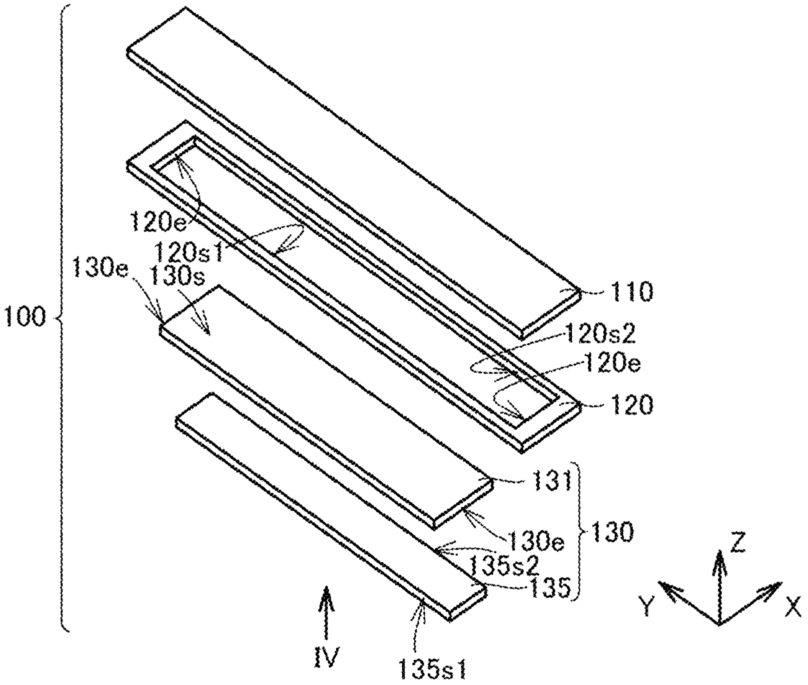
FIG. 2 is an exploded perspective view illustrating the structure of the ultrasonic transducer according to example embodiment 1 of the present invention.

FIG. 1 is a vertical sectional view illustrating the structure of an ultrasonic transducer according to example embodiment 1 of the present invention. FIG. 2 is an exploded perspective view illustrating the structure of the ultrasonic transducer according to example embodiment 1 of the present invention. As illustrated in FIGS. 1 and 2, an ultrasonic transducer 100 according to example embodiment 1 of the present invention includes a first diaphragm 110, a frame body 120, and a unimorph piezoelectric vibrator 130.

The first diaphragm 110 has a flat shape. The first diaphragm 110 is made of a metal, which is an aluminum alloy, such as, for example, duralumin including aluminum, or a stainless steel. In the present example embodiment, the first diaphragm 110 is made of an aluminum alloy, for example. Since an aluminum alloy has a small Young's modulus, the stress generated in the first diaphragm 110 when the ultrasonic transducer 100 is driven can be reduced by the first diaphragm 110 being made of an aluminum alloy. The thickness of the first diaphragm 110 is, for example, about 0.05 mm or more and about 0.2 mm or less.

The frame body 120 has a rectangular or substantially rectangular track shape. The frame body 120 has a lateral direction along a first direction (X-axis direction) and a longitudinal direction along a second direction (Y-axis direction) The frame body 120 extends in the second direction (Y-axis direction). The axial direction of the frame body 120 is along the third direction (Z-axis direction). One end of the frame body 120 in the third direction (Z-axis direction) is joined to the first diaphragm 110 by an adhesive made of, for example, an epoxy resin or the like.

The frame body 120 is made of, for example, a glass epoxy, a resin, or a metal, such as an aluminum alloy, an iron-nickel alloy (42Ni—Fe), or a stainless steel. In terms of reducing or preventing characteristic changes due to temperature changes of the ultrasonic transducer 100, the frame body 120 is, for example, preferably made of a metal. On the other hand, in terms of reducing the frequency of the ultrasonic waves transmitted or received by the ultrasonic transducer 100 and reducing the size of the ultrasonic transducer 100, the frame body 120 is, for example, preferably made of a resin. In the present example embodiment, the frame body 120 is made of a stainless steel. The thickness of the frame body 120 is, for example, about 0.2 mm or more and about 0.6 mm or less.

Figure 3:
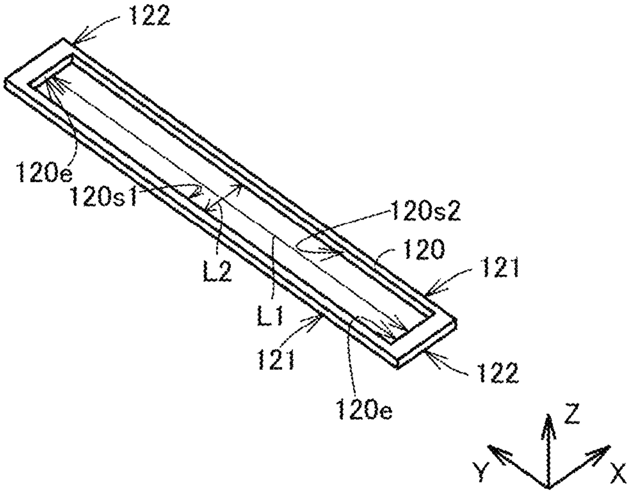
FIG. 3 is a perspective view illustrating the structure of a frame body of the ultrasonic transducer according to example embodiment 1 of the present invention.

FIG. 3 is a perspective view illustrating the structure of the frame body of the ultrasonic transducer according to example embodiment 1 of the present invention. As illustrated in FIG. 3, the frame body 120 includes a pair of long-side portions 121 extending in the second direction (Y-axis direction) and a pair of short-side portions 122 extending in the first direction (X-axis direction). The pair of long-side portions 121 and the pair of short-side portions 122 are connected to each other to form the inner peripheral surface of the frame body 120. The average distance between the short-side portions 122 is, for example, about four or more times the shortest distance between the long-side portions 121. That is, a longitudinal dimension L1 in the second direction (Y-axis direction) inside the frame body 120 is, for example, about four or more times a lateral dimension L2 in the first direction (X-axis direction) inside the frame body 120.

The corner portions between the long-side portions 121 and the short-side portions 122 may be chamfered. In addition, as viewed in the third direction (Z-axis direction), the shape of the short-side portions 122 is not limited to a straight line and may be, for example, an arc that is concave toward the inside of the frame body 120 or an arc that is concave toward the outside of the frame body 120.

The resonant frequency of the first diaphragm 110 can be adjusted by the lateral dimension L2 in the first direction (X-axis direction) inside the frame body 120 being changed. For example, when the resonant frequency of the first diaphragm 110 is set to about 100 kHz or higher, the lateral dimension L2 described above is about 1.5 mm or more and about 3 mm or less.

The longitudinal dimension L1 in the second direction (Y-axis direction) inside the frame body 120 is, for example, about four or more times the lateral dimension L2, and the longitudinal dimension L1 is, for example, about 20 mm or more in terms of increasing the acoustic pressure level of the ultrasonic waves transmitted by the ultrasonic transducer 100.

Figure 4:
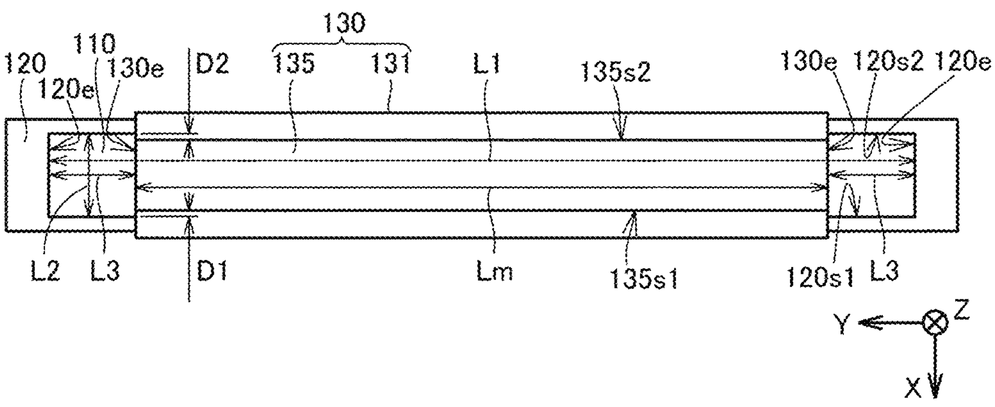
FIG. 4 is a diagram of the ultrasonic transducer in FIG. 2 as viewed in the direction of arrow IV.

FIG. 4 is a diagram of the ultrasonic transducer in FIG. 2 as viewed in the direction of arrow IV. As illustrated in FIGS. 1 and 4, the unimorph piezoelectric vibrator 130 is attached to the frame body 120. The unimorph piezoelectric vibrator 130 includes a piezoelectric body 131 facing the first diaphragm 110 with a space therebetween and a second diaphragm 135 provided on an opposite side of the piezoelectric body 131 from the frame body 120. The piezoelectric body 131 has a rectangular or substantially rectangular parallelepiped shape. The thickness of the piezoelectric body 131 is, for example, about 0.1 mm or more and about 0.2 mm or less. The piezoelectric body 131 is made of, for example, a piezoelectric ceramic.

The second diaphragm 135 is made of, for example, a glass epoxy, a ceramic, or a metal, such as an aluminum alloy, an iron-nickel alloy (42Ni—Fe), or a stainless steel. In the present example embodiment, the second diaphragm 135 is made of, for example, an iron-nickel alloy (42Ni—Fe). The second diaphragm 135 has a rectangular or substantially rectangular parallelepiped shape. The second diaphragm 135 is joined to the piezoelectric body 131. The length of the second diaphragm 135 in the second direction (Y-axis direction) is equivalent to the length of the piezoelectric body 131 in the second direction (Y-axis direction). A lateral dimension W of the second diaphragm 135 in the first direction (X-axis direction) and the lateral dimension L2 in the first direction (X-axis direction) inside the frame body 120 satisfy the relationship represented by, for example, $(2/3)\,L2 \leq W < L2$. The thickness of the second diaphragm 135 is, for example, about 0.2 mm or more and about 0.4 mm or less. When the shape of the second diaphragm 135 as viewed in the third direction (Z-axis direction) is not a rectangle but an ellipse or the like, the lateral dimension W is an average value.

As illustrated in FIG. 4, the second diaphragm 135 is located in a region interposed, in the first direction (X-axis direction), between both edges 120*s*1 and 120*s*2 in the first direction (X-axis direction) of the inner peripheral surface of the frame body 120 as viewed in the third direction (Z-axis direction) orthogonal to the first diaphragm 110.

As illustrated in FIG. 1, in the second diaphragm 135, an average distance D1 in the first direction (X-axis direction) between one edge 120*s*1 in the first direction (X-axis direction) of the inner peripheral surface of the frame body 120 and one edge 135*s*1 in the first direction (X-axis direction) of the second diaphragm 135 and an average distance D2 in the first direction (X-axis direction) between the other edge 120*s*2 in the first direction (X-axis direction) of the inner peripheral surface of the frame body 120 and another edge 135*s*2 in the first direction (X-axis direction) of the second diaphragm 135 are one-sixth or less the lateral dimension L2 in the first direction (X-axis direction) inside the frame body 120.

As illustrated in FIG. 4, the longitudinal dimension L1 in the second direction (Y-axis direction) inside the frame body 120 is greater than a minimum dimension Lm of the piezoelectric body 131 of the unimorph piezoelectric vibrator 130 in the second direction (Y-axis direction). The minimum dimension Lm of the piezoelectric body 131 of the unimorph piezoelectric vibrator 130 in the second direction (Y-axis direction) is the minimum dimension in the second direction (Y-axis direction) of one of a plurality of piezoelectric bodies that has the shortest length in the second direction (Y-axis direction) when the unimorph piezoelectric vibrator 130 has a laminated structure including the plurality of laminated piezoelectric bodies. For example, when the unimorph piezoelectric vibrator 130 has a laminated structure including two piezoelectric bodies 131, polarization directions Dp of the two piezoelectric bodies 131 face each other in the third direction (Z-axis direction). Since electric fields applied to the two piezoelectric bodies 131 are also opposite to each other in the third direction (Z-axis direction), the unimorph piezoelectric vibrator includes the two piezoelectric bodies 131 that perform bending vibration in the same or substantially the same manner.

In FIG. 4, the piezoelectric body 131 and the second diaphragm 135 overlap each other without being displaced in the second direction (Y-axis direction). The length of the piezoelectric body 131 in the second direction (Y-axis direction) is smaller than the longitudinal dimension L1 in the second direction (Y-axis direction) inside the frame body 120 in the present example embodiment, but the present invention is not limited to the present example embodiment and may be equal to or greater than the longitudinal dimension L1 in the second direction (Y-axis direction) inside the frame body 120.

An average distance L3 in the second direction (Y-axis direction) of a gap between at least one of edges 120*e* in the second direction (Y-axis direction) of the inner peripheral surface of the frame body 120 and at least one of edges 130*e* in the second direction (Y-axis direction) of a surface 130*s* of the piezoelectric body 131 of the unimorph piezoelectric vibrator 130 illustrated in FIG. 2 closer to the frame body 120 is, for example, about 1.3 or less times the lateral dimension L2 in the first direction (X-axis direction) inside the frame body 120.

In the present example embodiment, the average distance L3 in the second direction (Y-axis direction) of the gap between one of the edges 120*e* in the second direction (Y-axis direction) of the inner peripheral surface of the frame body 120 and one of the edges 130*e* in the second direction (Y-axis direction) of the surface 130*s* of the piezoelectric body 131 of the unimorph piezoelectric vibrator 130 closer to the frame body 120 is, for example, about 1.3 or less times the lateral dimension L2 in the first direction (X-axis direction) inside the frame body 120, and the average distance L3 of the gap between the other of the edges 120*e* in the second direction (Y-axis direction) of the inner peripheral surface of the frame body 120 and the other of the edges 130*e* in the second direction (Y-axis direction) of the surface 130*s* of the piezoelectric body 131 of the unimorph piezoelectric vibrator 130 closer to the frame body 120 is, for example, about 1.3 or less times the lateral dimension L2 in the first direction (X-axis direction) inside the frame body 120.

Figure 5:
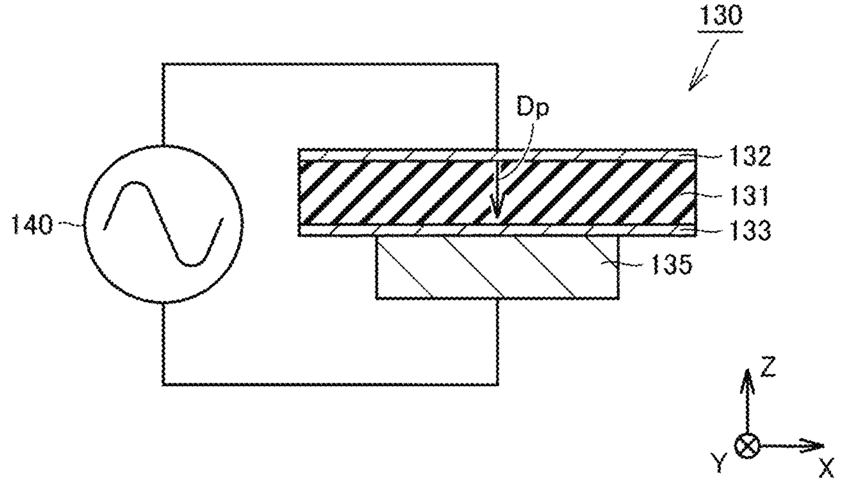
FIG. 5 is a sectional view illustrating the structure of a unimorph piezoelectric vibrator of the ultrasonic transducer according to example embodiment 1 of the present invention.

FIG. 5 is a sectional view illustrating the structure of the unimorph piezoelectric vibrator of the ultrasonic transducer according to example embodiment 1 of the present invention. As illustrated in FIG. 1, the unimorph piezoelectric vibrator 130 is attached to the frame body 120 and faces the first diaphragm 110 with a space therebetween. Specifically, the unimorph piezoelectric vibrator 130 is attached to the other ends in the third direction (Z-axis direction) of the pair of long-side portions 121 of the frame body 120 and faces the first diaphragm 110 with an inner space of the frame body 120 therebetween.

As illustrated in FIGS. 1, 2, and 5, the unimorph piezoelectric vibrator 130 is a piezoelectric element including the piezoelectric body 131. As illustrated in FIG. 5, in the present example embodiment, the piezoelectric body 131 is sandwiched between a first electrode 132 and a second electrode 133. The polarization direction Dp of the piezoelectric body 131 is along the third direction (Z-axis direction). The first electrode 132 and the second electrode 133 are electrically connected to a processing circuit 140 capable of applying an AC voltage.

Figure 6:
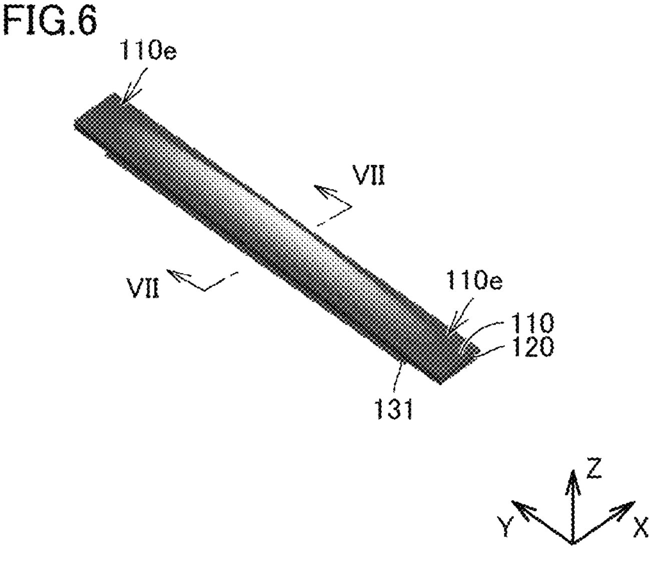
FIG. 6 is a perspective view illustrating the displacement state obtained by simulation analysis using a finite element method when the ultrasonic transducer according to example embodiment 1 of the present invention was transmitting or receiving ultrasonic waves.
Figure 7:
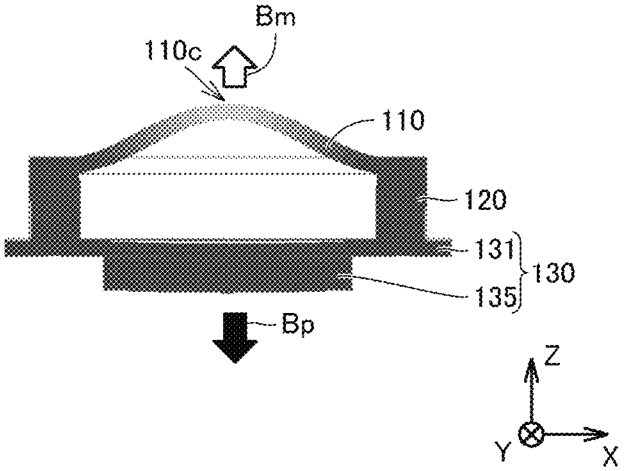
FIG. 7 is a sectional view of the ultrasonic transducer in FIG. 6 as viewed in the direction of arrows VII-VII.

FIG. 6 is a perspective view illustrating the displacement state obtained by simulation analysis using a finite element method when the ultrasonic transducer according to example embodiment 1 of the present invention was transmitting or receiving ultrasonic waves. FIG. 7 is a sectional view of the ultrasonic transducer in FIG. 6 as viewed along arrows VII-VII. In the conditions of simulation analysis, for example, the thickness of the first diaphragm 110 was about 0.1 mm, the thickness of the piezoelectric body 131 was about 0.1 mm, the thickness of the second diaphragm 135 was about 0.2 mm, the longitudinal dimension L1 and the lateral dimension L2 inside the frame body 120 were about 20 mm and about 1.8 mm, and the thickness of the frame body 120 in the third direction (Z-axis direction) was about 0.4 mm.

As illustrated in FIGS. 6 and 7, in the vibration mode of the ultrasonic transducer 100 according to example embodiment 1 of the present invention, the first diaphragm 110 resonantly vibrates in a phase opposite to the phase of the unimorph piezoelectric vibrator 130 in the third direction (Z-axis direction) orthogonal to the first diaphragm 110. That is, as illustrated in FIG. 7, the displacement direction of resonant vibration Bm of the first diaphragm 110 is opposite to the displacement direction of resonant vibration Bp of the unimorph piezoelectric vibrator 130 in the third direction (Z-axis direction). In the present example embodiment, the resonant frequency between the first diaphragm 110 and the unimorph piezoelectric vibrator 130 is, for example, about 100 kHz or higher.

In the first diaphragm 110, a middle portion 110*c* located in the middle in the longitudinal direction inside the frame body 120 is a node of resonant vibration, and end portions 110*e* located at both ends in the longitudinal direction inside the frame body 120 are antinodes of the resonant vibration. That is, a portion of the first diaphragm 110 that is located above the inner space of the frame body 120 is the vibrational region that resonantly vibrates. The longitudinal dimension of the vibrational region of the first diaphragm 110 is the same or substantially the same to the longitudinal dimension L1 inside the frame body 120, and the lateral dimension of the vibrational region of the first diaphragm 110 is the same or substantially the same to the lateral dimension L2 inside the frame body 120.

Here, the relationship between the resonant frequency of the first diaphragm 110 and the longitudinal dimension L1 inside the frame body 120 will be described.

Figure 8:
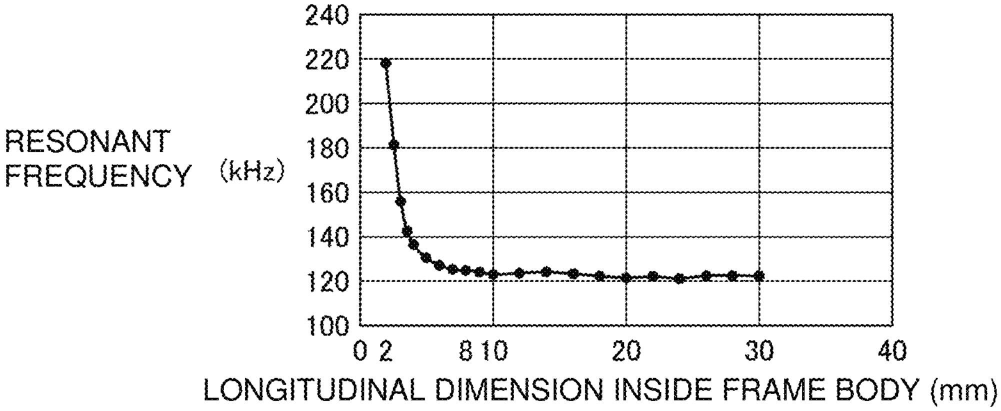
FIG. 8 is a graph illustrating changes in the resonant frequency of a first diaphragm obtained by simulation analysis using a finite element method when a longitudinal dimension was changed with a lateral dimension inside the frame body fixed.

FIG. 8 is a graph illustrating changes in the resonant frequency of the first diaphragm obtained by simulation analysis using a finite element method when the longitudinal dimension was changed with the lateral dimension inside the frame body fixed. In FIG. 8, the vertical axis represents the resonant frequency (kHz) of the first diaphragm 110, and the horizontal axis represents the longitudinal dimension L1 (mm) inside the frame body 120. In the conditions of simulation analysis, the lateral dimension L2 inside the frame body 120 was fixed to, for example, about 2 mm.

As illustrated in FIG. 8, for example, the resonant frequency of the first diaphragm 110 when the longitudinal dimension L1 inside the frame body 120 was about 2 mm was about 220 kHz, and the resonant frequency of the first diaphragm 110 decreased to 122 kHz when the longitudinal dimension L1 increased to about 8 mm and the longitudinal dimension of the vibrational region of the first diaphragm 110 increased. After that, even when the longitudinal dimension L1 within the frame body 120 became greater than about 8 mm and the longitudinal dimension of the vibrational region of the first diaphragm 110 further increased, the resonant frequency of the first diaphragm 110 remained substantially constant at about 122 kHz.

That is, for example, the resonant frequency of the first diaphragm 110 is determined by the acoustic velocity of the first diaphragm 110 and the reflection of vibration with the frame body 120 used as a fixed end. However, after the longitudinal dimension L1 inside the frame body 120 exceeds about four times the lateral dimension L2, the effect of the lateral dimension L2 on the reflection of vibration becomes dominant, and the state of the reflection of vibration does not change even when the longitudinal dimension L1 is more than four times the lateral dimension L2.

Next, the following will describe the results of simulation analysis using a finite element method of the relationship between the acoustic pressure of ultrasonic waves transmitted by the ultrasonic transducer 100 and the longitudinal dimension L1 inside the frame body 120.

Figure 9:
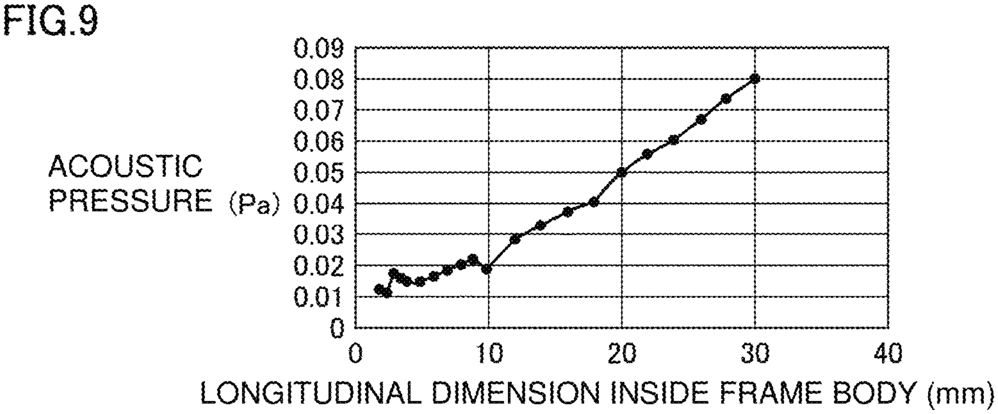
FIG. 9 is a graph illustrating changes in the acoustic pressure of ultrasonic waves transmitted by the ultrasonic transducer obtained by simulation analysis using a finite element method when the longitudinal dimension was changed with the lateral dimension inside the frame body fixed.

FIG. 9 is a graph illustrating changes in the acoustic pressure of ultrasonic waves transmitted by the ultrasonic transducer obtained by simulation analysis using a finite element method when the longitudinal dimension was changed with the lateral dimension inside the frame body fixed. In FIG. 9, the vertical axis represents the acoustic pressure (Pa) transmitted by the ultrasonic transducer 100, and the horizontal axis represents the longitudinal dimension L1 (mm) inside the frame body 120. In the conditions of simulation analysis, for example, the acoustic pressure (Pa) at a position 30 cm away in the Z-axis direction (third direction) from the first diaphragm 110 in front of the ultrasonic transducer 100 was calculated with the lateral dimension L2 inside the frame body 120 fixed to about 2 mm.

As illustrated in FIG. 9, the acoustic pressure of ultrasonic waves transmitted by the ultrasonic transducer 100 increased as the longitudinal dimension L1 inside the frame body 120 increased. This means that the entire vibrational region of the first diaphragm 110 between both end portions 110*e* vibrates even when the longitudinal dimension of the vibrational region of the first diaphragm 110 increases. That is, the area of the vibrational region can be increased by increases in the length of the vibrational region of the first diaphragm 110, and accordingly, a higher acoustic pressure can be obtained by increasing changes in air pressure due to the vibration of the first diaphragm 110.

As described above, the ultrasonic transducer 100 according to the present example embodiment can increase the acoustic pressure while maintaining the resonant frequency approximately constant by increasing the longitudinal dimension of the vibrational region of the first diaphragm 110. In addition, since there are node points at both end portions in the longitudinal direction, the ultrasonic transducer 100 can be easily provided by supporting or fixing these end portions.

Next, the following will describe the results of simulation analysis using a finite element method of the relationship between the acoustic pressure of ultrasonic waves transmitted by the ultrasonic transducer and the minimum dimension Lm of the piezoelectric body 131 in the second direction (Y-axis direction).

Figure 10:
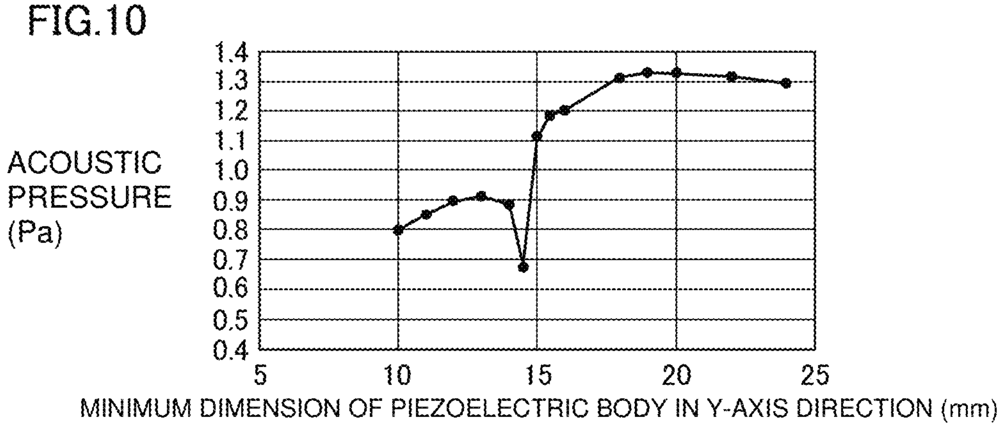
FIG. 10 is a graph illustrating changes in the acoustic pressure of ultrasonic waves transmitted by the ultrasonic transducer obtained by simulation analysis using a finite element method when the minimum dimension of an ultrasonic vibrator in a second direction (Y-axis direction) was changed.

FIG. 10 is a graph illustrating changes in the acoustic pressure of ultrasonic waves transmitted by the ultrasonic transducer obtained by simulation analysis using a finite element method when the minimum dimension of an ultrasonic vibrator in the second direction (Y-axis direction) was changed. In FIG. 10, the vertical axis represents the acoustic pressure (Pa) transmitted by the ultrasonic transducer, and the horizontal axis represents the minimum dimension Lm (mm) of the piezoelectric body in the second direction (Y-axis direction).

In the conditions of simulation analysis, for example, the dimensions in the second direction (Y-axis direction) and in the first direction (X-axis direction) of the outer shape of the frame body 120 were about 24 mm and about 2.6 mm, the thickness of the frame body 120 in the third direction (Z-axis direction) was about 0.4 mm, and the longitudinal dimension L1 and the lateral dimension L2 inside the frame body 120 were about 20 mm and about 1.8 mm. The dimension of the outer shape of the first diaphragm 110 was the same as that of the outer shape of the frame body 120, and the thickness of the first diaphragm 110 was about 0.1 mm. The dimension of the piezoelectric body 131 in the first direction (X-axis direction) was about 2.4 mm, and the thickness of the piezoelectric body 131 was about 0.1 mm. The piezoelectric body 131 was disposed point-symmetrically with respect to the center of the frame body 120 as viewed in the third direction (Z-axis direction). The dimension of the second diaphragm 135 in the first direction (X-axis direction) was about 1.5 mm, and the thickness of the second diaphragm 135 was about 0.2 mm. The dimensions of the piezoelectric body 131 and the second diaphragm 135 in the second direction (Y-axis direction) were the same or substantially the same as each other. The acoustic pressure (Pa) at a position 30 cm away in the third direction (Z-axis direction) from the first diaphragm (110) in front of the ultrasonic transducer was calculated.

Figure 11:
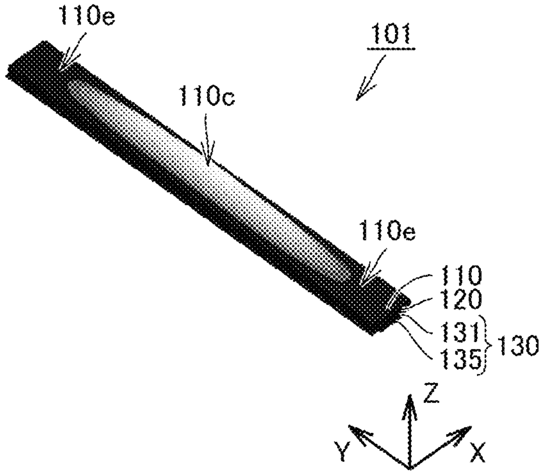
FIG. 11 is a perspective view illustrating the displacement state obtained by simulation analysis using a finite element method when an ultrasonic transducer according to a first example of example embodiment 1 of the present invention, in which the minimum dimension of the piezoelectric body in the second direction (Y-axis direction) was about 24 mm, was transmitting or receiving ultrasonic waves.
Figure 12:
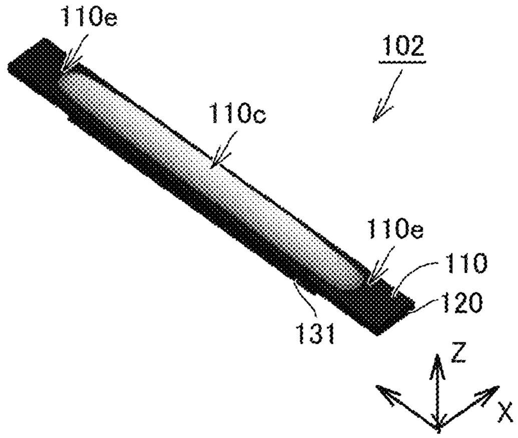
FIG. 12 is a perspective view illustrating the displacement state obtained by simulation analysis using a finite element method when an ultrasonic transducer according to a second example of example embodiment 1 of the present invention, in which the minimum dimension of the piezoelectric body in the second direction (Y-axis direction) was about 16 mm, was transmitting or receiving ultrasonic waves.
Figure 13:
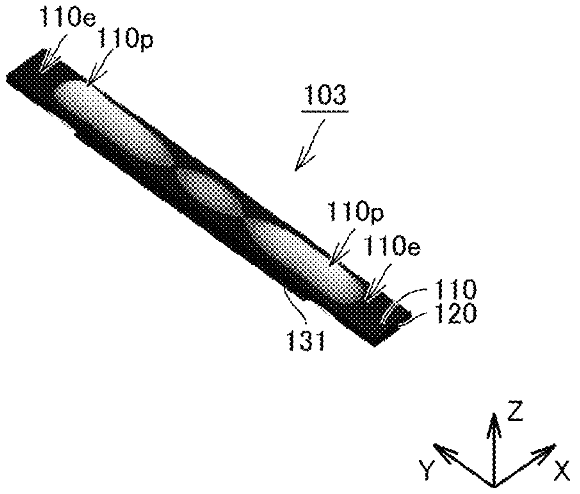
FIG. 13 is a perspective view illustrating the displacement state obtained by simulation analysis using a finite element method when an ultrasonic transducer according to a third example of example embodiment 1 of the present invention, in which the minimum dimension of the piezoelectric body in the second direction (Y-axis direction) was about 15 mm, was transmitting or receiving ultrasonic waves.
Figure 14:
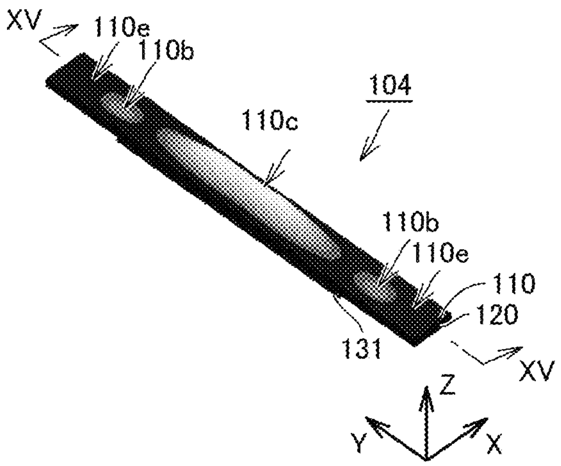
FIG. 14 is a perspective view illustrating the displacement state obtained by simulation analysis using a finite element method when an ultrasonic transducer according to a fourth example of example embodiment 1 of the present invention, in which the minimum dimension of the piezoelectric body in the second direction (Y-axis direction) was about 14.5 mm, was transmitting or receiving ultrasonic waves.
Figure 15:
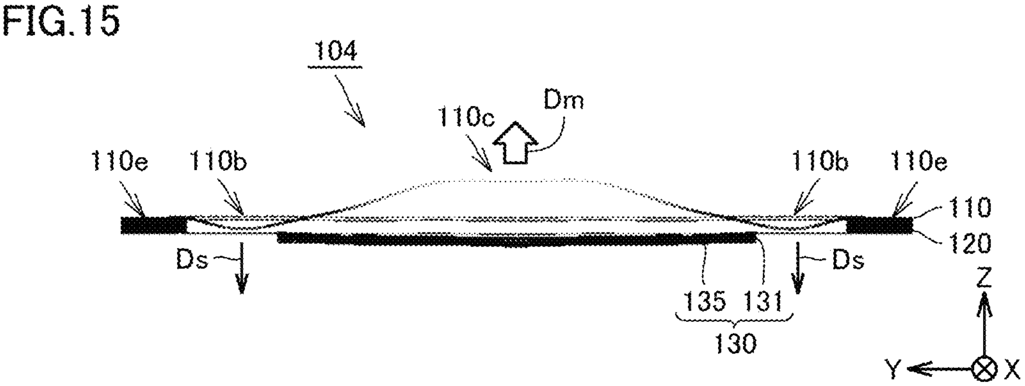
FIG. 15 is a sectional view of the ultrasonic transducer in FIG. 14 as viewed in the direction of arrows XV-XV.

FIG. 11 is a perspective view illustrating the displacement state obtained by simulation analysis using a finite element method when an ultrasonic transducer according to a first example, in which the minimum dimension of the piezoelectric body in the second direction (Y-axis direction) was, for example, about 24 mm, was transmitting or receiving ultrasonic waves. FIG. 12 is a perspective view illustrating the displacement state obtained by simulation analysis using a finite element method when an ultrasonic transducer according to a second example, in which the minimum dimension of the piezoelectric body in the second direction (Y-axis direction) was, for example, about 16 mm, was transmitting or receiving ultrasonic waves. FIG. 13 is a perspective view illustrating the displacement state obtained by simulation analysis using a finite element method when an ultrasonic transducer according to a third example, in which the minimum dimension of the piezoelectric body in the second direction (Y-axis direction) was, for example, about 15 mm, was transmitting or receiving ultrasonic waves. FIG. 14 is a perspective view illustrating the displacement state obtained by simulation analysis using a finite element method when an ultrasonic transducer according to a fourth example, in which the minimum dimension of the piezoelectric body in the second direction (Y-axis direction) was, for example, about 14.5 mm, was transmitting or receiving ultrasonic waves. FIG. 15 is a sectional view of the ultrasonic transducer in FIG. 14 as viewed along arrows XV-XV.

As illustrated in FIGS. 11 and 12, in the ultrasonic transducer 101 according to example embodiment 1 and the ultrasonic transducer 102 according to example embodiment 2 in which the minimum dimension of the piezoelectric body 131 in the second direction (Y-axis direction) was, for example, about 16 mm or more, the first diaphragm 110 vibrated in a tine vibration mode in which the middle portion 110*c* of the first diaphragm 110 defined and functioned as a node of resonant vibration. In the ultrasonic transducer 103 according to the third example in which the minimum dimension of the piezoelectric body 131 in the second direction (Y-axis direction) was, for example, about 15 mm as illustrated in FIG. 13, the first diaphragm 110 vibrated in a vibration mode in which large-displacement portions 110*p* that displaced the most appeared near both end portions in the longitudinal direction inside the frame body 120 in the first diaphragm 110. The two large-displacement portions 110*p* were vibrating in the same phase and the vibration of the first diaphragm 110 vibrated in the same phase.

In the ultrasonic transducer 104 according to the fourth example in which the minimum dimension of the piezoelectric body 131 in the second direction (Y-axis direction) was, for example, about 14.5 mm as illustrated in FIGS. 14 and 15, the first diaphragm 110 vibrated in a vibration mode in which reverse displacement portions 110*b* that displaced in an displacement direction Ds opposite to a displacement direction Dm of the middle portion 110*c* appear near both end portions in the longitudinal direction inside the frame body 120 in the first diaphragm 110. That is, in the first diaphragm 110, vibration in a phase opposite to the phase of the middle portion 110*c* occurred near the end portions in the longitudinal direction inside the frame body 120.

As a result, as illustrated in FIG. 10, the acoustic pressure of ultrasonic waves transmitted by the ultrasonic transducer 104 according to the fourth example in which the minimum dimension of the piezoelectric body 131 in the second direction (Y-axis direction) was 14.5 mm was approximately half the acoustic pressure of ultrasonic waves transmitted by the ultrasonic transducer 102 according to the second example in which the minimum dimension of the piezoelectric body 131 in the second direction (Y-axis direction) was 16 mm.

In the ultrasonic transducer 104 according to the fourth example, the average distance L3 in the second direction (Y-axis direction) of the gap between the at least one of the edges 120*e* in the second direction (Y-axis direction) of an inner peripheral surface 120*s* of the frame body 120 and at least one of the edges 130*e* in the second direction (Y-axis direction) of the surface 130*s* of the unimorph piezoelectric vibrator 130 closer to the frame body 120 is, for example, about 2.75 mm, which is approximately 1.5 times the lateral dimension L2 in the first direction (X-axis direction) inside the frame body 120. That is, when the average distance L3 described above is approximately 1.5 times the lateral dimension L2 in the first direction (X-axis direction) inside the frame body 120, vibration in an opposite phase occurred the first diaphragm 110 occurs.

It has been discovered from simulation analysis using a finite element method that, although changes in the length of the unimorph piezoelectric vibrator 130 in the second direction (Y-axis direction) and the lateral dimension L2 in the first direction (X-axis direction) inside the frame body 120 cause slight fluctuations, when the average distance L3 described above is, for example, about 1.3 or less times the lateral dimension L2 in the first direction (X-axis direction) inside the frame body 120, vibration in an opposite phase does not occur in the first diaphragm 110. That is, when the average distance L3 is, for example, about 1.3 or less times the lateral dimension L2 in the first direction (X-axis direction) inside the frame body 120, the power consumption can be reduced while the acoustic pressure of ultrasonic waves transmitted by ultrasonic transducer is maintained high.

Here, the power consumption of the ultrasonic transducer will be described. The piezoelectric body 131 of the unimorph piezoelectric vibrator 130, particularly a piezoelectric ceramic, has electrical characteristics similar to those of capacitors, such as a high dielectric constant. The impedance of a capacitor is proportional to 1/ωC where ω is the frequency of alternate current and C is the capacitance. Accordingly, when the frequency of a voltage applied to the piezoelectric body 131 increases, the impedance of the piezoelectric body 131 decreases and the power consumption increases. On the other hand, since the capacity decreases when the area of the piezoelectric body 131 decreases, the power consumption decreases.

In the ultrasonic transducer 101 according to the first example in which the minimum dimension of the unimorph piezoelectric vibrator 130 in the second direction (Y-axis direction) was, for example, about 24 mm, as illustrated in FIG. 11, the end portions 110*e* located at both ends in the longitudinal direction inside the frame body 120 in the first diaphragm 110 defined and functioned as nodes of resonant vibration and hardly vibrated. That is, both end portions of the unimorph piezoelectric vibrator 130 in the second direction (Y-axis direction) hardly vibrated and did not perform any work.

Accordingly, in the present example embodiment, as illustrated in FIG. 4, the minimum dimension Lm of the piezoelectric body 131 in the second direction (Y-axis direction) is smaller than the longitudinal dimension L1 in the second direction (Y-axis direction) inside the frame body 120, such that a gap is provided between at least one of the edges 120*e* of the inner peripheral surface 120*s* of the frame body 120 in the second direction (Y-axis direction) and at least one of the edges 130*e* in the second direction (Y-axis direction) of the surface 130*s* of the piezoelectric body 131 illustrated in FIG. 2 closer to the frame body 120. Accordingly, both end portions in the second direction (Y-axis direction) of the unimorph piezoelectric vibrator 130, which are the portions that do not work but consume power illustrated in FIG. 11, can be eliminated, and the efficiency of the unimorph piezoelectric vibrator 130 can be improved by reducing the power consumption thereof.

In addition, since the gap described above is provided and the internal space inside the frame body 120 communicates with the external space outside the frame body 120 through the gap, the internal stress of the ultrasonic transducer 100 can be reduced or prevented from increasing by the pressure change in the internal space being reduced when an adhesive for joining, for example, the first diaphragm 110 and the frame body 120 is solidified by being heated. When the first diaphragm 110 and the frame body 120 are joined to each other by the adhesive, to prevent the gap from being filled with the adhesive that has been applied to the long-side portion 121 of the frame body 120 and filled the gap, the average distance L3 of the gap in the second direction (Y-axis direction) is, for example, preferably about 0.2 mm or more. That is, the average distance L3 in the second direction (Y-axis direction) of the gap is, for example, preferably about 0.2 mm or more and about 1.3 or less times the lateral dimension L2 in the first direction (X-axis direction) inside the frame body 120.

Figure 16:
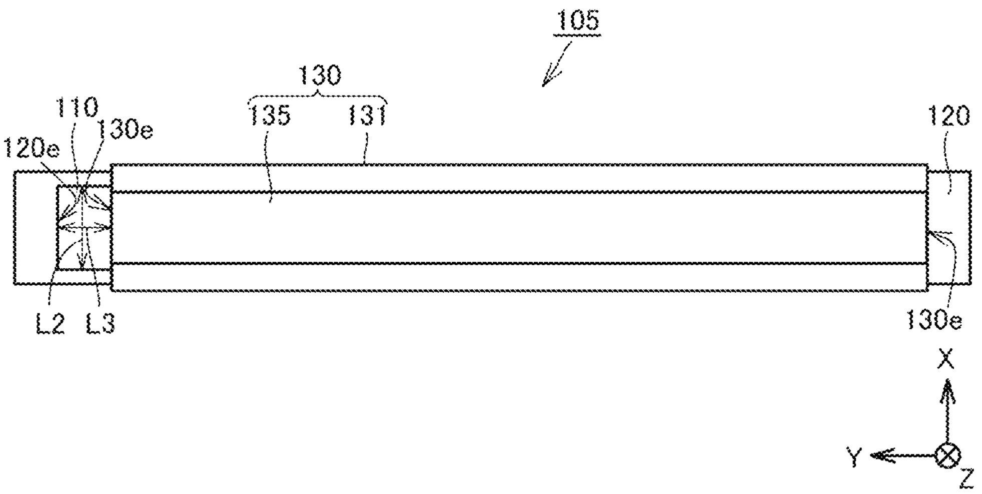
FIG. 16 is a diagram of an ultrasonic transducer according to a fifth example of example embodiment 1 of the present invention as viewed from the side of the ultrasonic vibrator.

FIG. 16 is a diagram of an ultrasonic transducer according to a fifth example of example embodiment 1 of the present invention as viewed from the side of the ultrasonic vibrator. As illustrated in FIG. 16, in an ultrasonic transducer 105 according to the fifth example of example embodiment 1 of the present invention, the average distance L3 in the second direction (Y-axis direction) of the gap between one of the edges 120*e* in the second direction (Y-axis direction) of the inner peripheral surface 120*s* of the frame body 120 and one of the edges 130*e* in the second direction (Y-axis direction) of the face 130*s* of the piezoelectric body 131 of the unimorph piezoelectric vibrator 130 closer to the frame body 120 is, for example, about 1.3 or less times the lateral dimension L2 in the first direction (X-axis direction) inside the frame body 120, and no gap is formed between the other of the edges 120*e* in the second direction (Y-axis direction) of the inner peripheral surface 120*s* of the frame body 120 and the other of the edges 130*e* in the second direction (Y-axis direction) of the surface 130*s* of the piezoelectric body 131 of the unimorph piezoelectric vibrator 130 closer to the frame body 120. That is, it is possible to eliminate only one of the both end portions in the second direction (Y-axis direction) of the unimorph piezoelectric vibrator 130 illustrated in FIG. 11, which is a portion that does not work but consumes power.

Figure 17:
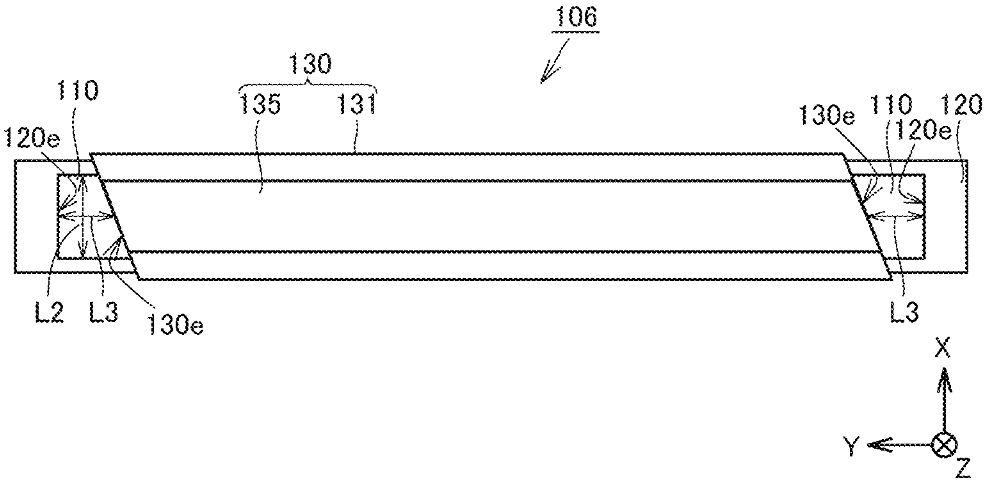
FIG. 17 is a diagram of an ultrasonic transducer according to a sixth example of example embodiment 1 of the present invention as viewed from the side of the ultrasonic vibrator.

FIG. 17 is a diagram of an ultrasonic transducer according to a sixth example of example embodiment 1 of the present invention as viewed from the side of the ultrasonic vibrator. As illustrated in FIG. 17, in an ultrasonic transducer 106 according to the sixth example of example embodiment 1 of the present invention, as viewed in the third direction (Z-axis direction), one of the edges 130*e* in the second direction (Y-axis direction) of the surface 130*s* of the piezoelectric body 131 of the unimorph piezoelectric vibrator 130 closer to the frame body 120 is not parallel or substantially parallel to at least one of the edges 120*e* in the second direction (Y-axis direction) of the inner peripheral surface 120*s* of the frame body 120. In this case, the average distance L3 in the second direction (Y-axis direction) of the gap between at least one of the edges 120*e* of the inner peripheral surface 120*s* of the frame body 120 in the second direction (Y-axis direction) and one of the edges 130*e* in the second direction (Y-axis direction) of the surface 130*s* of the piezoelectric body 131 of the unimorph piezoelectric vibrator 130 illustrated in FIG. 2 closer to the frame body 120 is the average value of the shortest distance between this edge 120*e* and this edge 130*e*, which varies depending on the positions in the first direction (X-axis direction), and the average distance L3 only needs to be, for example, about 1.3 or less times the lateral dimension L2 in the first direction (X-axis direction) inside the frame body 120.

Figure 18:
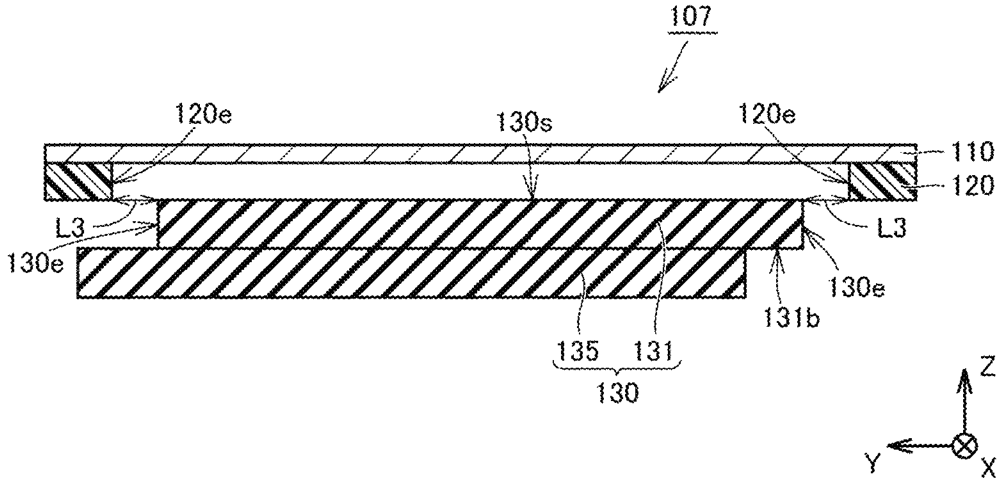
FIG. 18 is a sectional view illustrating the structure of an ultrasonic transducer according to a seventh example of example embodiment 1 of the present invention.

FIG. 18 is a sectional view illustrating the structure of an ultrasonic transducer according to a seventh example of example embodiment 1 of the present invention. As illustrated in FIG. 18, the average distance L3 of the gap in the second direction (Y-axis direction) between at least one of the edges 120*e* in the second direction (Y-axis direction) of the inner peripheral surface of the frame body 120 and at least one of the edges 130*e* in the second direction (Y-axis direction) of the surface 130*s* of the unimorph piezoelectric vibrator 130 closer to the frame body 120 is, for example, about 1.3 or less times the lateral dimension L2 in the first direction (X-axis direction) inside the frame body 120. As a result, the power consumption can be reduced and the acoustic pressure level can be increased by the simple and small-sized structure of an ultrasonic transducer 100*d*.

A portion of a surface 131*b* of the piezoelectric body 131 opposite to the frame body 120 is not covered with the second diaphragm 135. Specifically, since the second diaphragm 135 is shifted in the second direction (Y-axis direction) with respect to the piezoelectric body 131, the portion of the surface 131*b* of the piezoelectric body 131 opposite to the frame body 120 is exposed without being covered with the second diaphragm 135. As a result, wiring lines 10 to supply power to the piezoelectric body 131 can be easily connected to the portion of the surface 131*b* of the piezoelectric body 131 opposite to the frame body 120 not covered with the second diaphragm 135. The dimension of the second diaphragm 135 in the second direction (Y-axis direction) may be greater or smaller than or the same as the dimension of the piezoelectric body 131 in the second direction (Y-axis direction).

Here, the following will describe the results of a first experimental example that performed simulation analysis of the relationship between the displacement of the first diaphragm 110 and each of the average distance D1 in the first direction (X-axis direction) between one edge 120*s*1 in the first direction (X-axis direction) of the inner peripheral surface of the frame body 120 and one edge 135*s*1 in the first direction (X-axis direction) of the second diaphragm 135 and the average distance D2 in the first direction (X-axis direction) between the other edge 120*s*2 in the first direction (X-axis direction) of the inner peripheral surface of the frame body 120 and the other edge 135*s*2 in the first direction (X-axis direction) of the second diaphragm 135.

Figure 19:
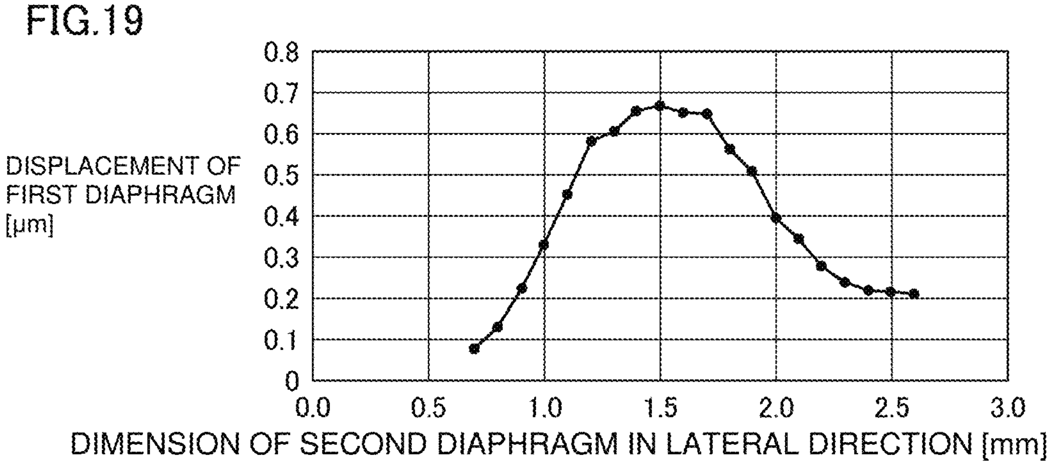
FIG. 19 is a graph illustrating changes in the displacement of the first diaphragm obtained by simulation analysis using a finite element method when a lateral dimension W of the second diaphragm was changed with a middle position of the second diaphragm in a first direction (X-axis direction) fixed in a first experimental example.

FIG. 19 is a graph illustrating changes in the displacement of the first diaphragm obtained by simulation analysis using a finite element method when the lateral dimension W of the second diaphragm was changed with the middle position of the second diaphragm in the first direction (X-axis direction) fixed in the first experimental example. In FIG. 19, the vertical axis represents the displacement (μm) of the first diaphragm 110, and the horizontal axis represents the lateral dimension W (mm) of the second diaphragm.

In the conditions of simulation analysis of the first experimental example, for example, the thickness of the first diaphragm 110 in the third direction (Z-axis direction) was about 0.1 mm, the longitudinal dimension of the piezoelectric body 131 in the second direction (Y-axis direction) was about 18 mm, the thickness of the piezoelectric body 131 in the third direction (Z-axis direction) was about 0.1 mm, the longitudinal dimension L1 and the lateral dimension L2 inside the frame body 120 were about 20 mm and about 1.8 mm, the thickness of the frame body 120 in the third direction (Z-axis direction) was about 0.4 mm, the thickness of the second diaphragm 135 in the third direction (Z-axis direction) was about 0.2 mm, and the longitudinal dimension of the second diaphragm 135 in the second direction (Y-axis direction) was about 18 mm. The material of the first diaphragm 110 was, for example, an aluminum alloy, the material of the frame body 120 was a stainless steel, and the material of the second diaphragm 135 was an iron-nickel alloy (42Ni—Fe). The middle position of the second diaphragm 135 in the first direction (X-axis direction) was aligned with the middle position of the inner space of the frame body 120 in the first direction (X-axis direction).

Figure 20:
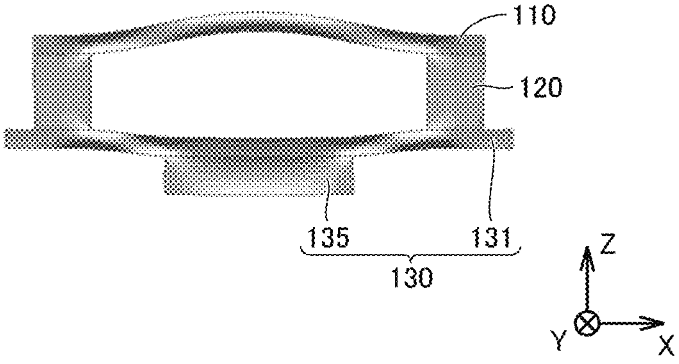
FIG. 20 is a sectional view illustrating the displacement state obtained by simulation analysis using a finite element method when an ultrasonic transducer according to a first comparative example, in which the lateral dimension of the second diaphragm in the first direction (X-axis direction) was about 1 mm, an average distance D1 in the first direction was about 0.4 mm, and an average distance D2 in the first direction was about 0.4 mm, was transmitting or receiving ultrasonic waves in the first experimental example.

FIG. 20 is a sectional view illustrating the displacement state obtained by simulation analysis using a finite element method when an ultrasonic transducer according to a first comparative example, for example, in which the lateral dimension W of the second diaphragm in the first direction (X-axis direction) was about 1 mm, the average distance D1 was about 0.4 mm, and the average distance D2 was about 0.4 mm, was transmitting or receiving ultrasonic waves in the first experimental example.

Figure 21:
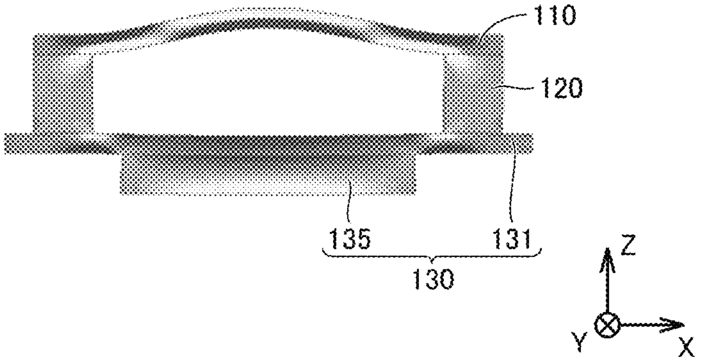
FIG. 21 is a sectional view illustrating the displacement state obtained by simulation analysis using a finite element method when an ultrasonic transducer according to an eighth example of example embodiment 1 of the present invention, in which the lateral dimension of the second diaphragm in the first direction (X-axis direction) was about 1.5 mm, the average distance D1 in the first direction was about 0.15 mm, and the average distance D2 in the first direction was about 0.15 mm, was transmitting or receiving ultrasonic waves in the first experimental example.

FIG. 21 is a sectional view illustrating the displacement state obtained by simulation analysis using a finite element method when an ultrasonic transducer according to an eighth example, for example, in which the lateral dimension W of the second diaphragm in the first direction (X-axis direction) was about 1.5 mm, the average distance D1 was about 0.15 mm, and the average distance D2 was about 0.15 mm, was transmitting or receiving ultrasonic waves in the first experimental example.

Figure 22:
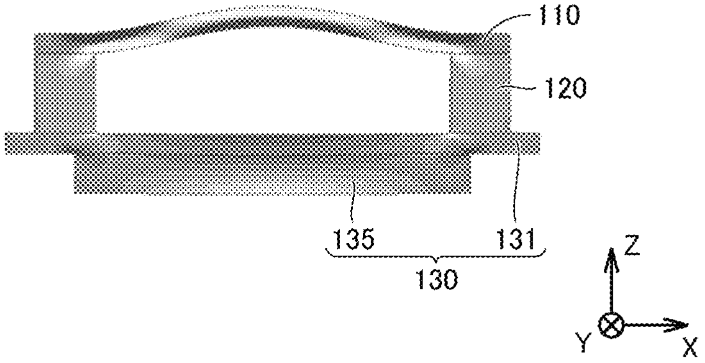
FIG. 22 is a sectional view illustrating the displacement state obtained by simulation analysis using a finite element method when an ultrasonic transducer according to a second comparative example, in which the lateral dimension of the second diaphragm in the first direction (X-axis direction) was about 2 mm, the average distance D1 was about −0.1 mm, and the average distance D2 was about −0.1 mm, was transmitting or receiving ultrasonic waves in the first experimental example.

FIG. 22 is a sectional view illustrating the displacement state obtained by simulation analysis using a finite element method when an ultrasonic transducer according to a second comparative example, for example, in which the lateral dimension W of the second diaphragm in the first direction (X-axis direction) was about 2 mm, the average distance D1 was about −0.1 mm, and the average distance D2 was about −0.1 mm, was transmitting or receiving ultrasonic waves in the first experimental example. FIGS. 20 to 22 illustrate sectional views the same or similar to the sectional view in FIG. 7, in which higher tensile stress in the first direction (X-axis direction) is indicated in a color closer to white and higher compressive stress in the first direction (X-axis direction) is indicated in a color closer to black in a grayscale.

As illustrated in FIG. 19, in the first experimental example, for example, when the lateral dimension W of the second diaphragm in the first direction (X-axis direction) was about 1.2 mm or more and about 1.8 mm or less, that is, when the average distance D1 and the average distance D2 were about 0 mm or more and about 0.3 mm or less, the displacement of the first diaphragm 110 could be ensured at a high level of about 0.56 μm or more when the resonant frequency fell within the range of about 150 kHz to about 160 kHz, and the transmitted acoustic pressure and the receiving sensitivity of the ultrasonic transducer 100 could be increased.

As illustrated in FIG. 20, for example, when the average distance D1 and the average distance D2 were about 0.3 mm or more, portions in which tensile stress occurred and portions in which compressive stress occurred are dispersed in the stress distribution in the piezoelectric body 131, and the vibration efficiency of the piezoelectric body 131 decreased, and the displacement of the first diaphragm 110 became smaller.

As illustrated in FIG. 21, for example, when the average distance D1 and the average distance D2 were about 0 or more and about 0.3 mm or less, portions in which high compressive stress occurred were present overall in the stress distribution in the piezoelectric body 131, the vibration efficiency of the piezoelectric body 131 was improved and the displacement of the first diaphragm 110 became greater.

As illustrated in FIG. 22, when the second diaphragm 135 is located outside the region interposed, in the first direction (X-axis direction), between both edges in the first direction (X-axis direction) of the inner peripheral surface of the frame body 120 as viewed in the third direction (Z-axis direction) orthogonal or substantially orthogonal to the first diaphragm 110, the piezoelectric body 131 is restrained and not likely to vibrate, and the stress in the piezoelectric body 131 is reduced overall. As a result, the vibration efficiency of the piezoelectric body 131 decreased, and the displacement of the first diaphragm 110 became smaller.

According to the operating mechanism illustrated in FIGS. 20 to 22, it is thought that, when the middle position of the second diaphragm 135 in the first direction (X-axis direction) is aligned with the middle position of the inner space of the frame body 120 in the first direction (X-axis direction), if the average distance D1 and the average distance D2 are one sixth or less the lateral dimension L2 in the first direction (X-axis direction) inside the frame body 120, the transmitted acoustic pressure and the receiving sensitivity of the ultrasonic transducer 100 can be increased by increasing the displacement of the first diaphragm 110.

The following will describe the results of analysis performed by changing the conditions of simulation analysis from those of the first experimental example. In the results of analysis described below, only the conditions changed from those of the first experimental example will be described, and the conditions not described are the same as those of the first experimental example.

Figure 23:
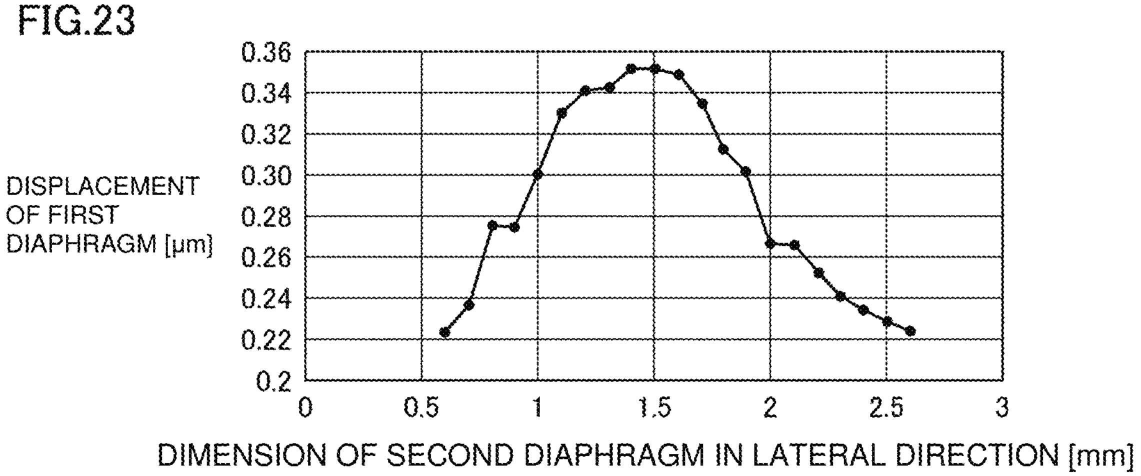
FIG. 23 is a graph illustrating changes in the displacement of the first diaphragm obtained by simulation analysis using a finite element method when the thickness of the piezoelectric body in the analysis conditions of the first experimental example was changed to about 0.2 mm, and the lateral dimension W of the second diaphragm was changed with the middle position of the second diaphragm in the first direction (X-axis direction) fixed in a second experimental example.

FIG. 23 is a graph illustrating changes in the displacement of the first diaphragm obtained by simulation analysis using a finite element method when the thickness of the piezoelectric body in the analysis conditions of the first experimental example was changed, for example, to about 0.2 mm, and the lateral dimension W of the second diaphragm was changed with the middle position of the second diaphragm in the first direction (X-axis direction) fixed in a second experimental example.

As illustrated in FIG. 23, in the second experimental example, for example, when the lateral dimension W of the second diaphragm in the first direction (X-axis direction) was about 1.2 mm or more and about 1.8 mm or less, that is, when the average distance D1 and the average distance D2 were about 0 mm or more and about 0.3 mm or less, the displacement of the first diaphragm 110 could be ensured at a high level of about 0.31 μm or more when the resonant frequency fell within a range of about 158 kHz to about 159 kHz, and the transmitted acoustic pressure and the receiving sensitivity of the ultrasonic transducer 100 could be increased.

Figure 24:
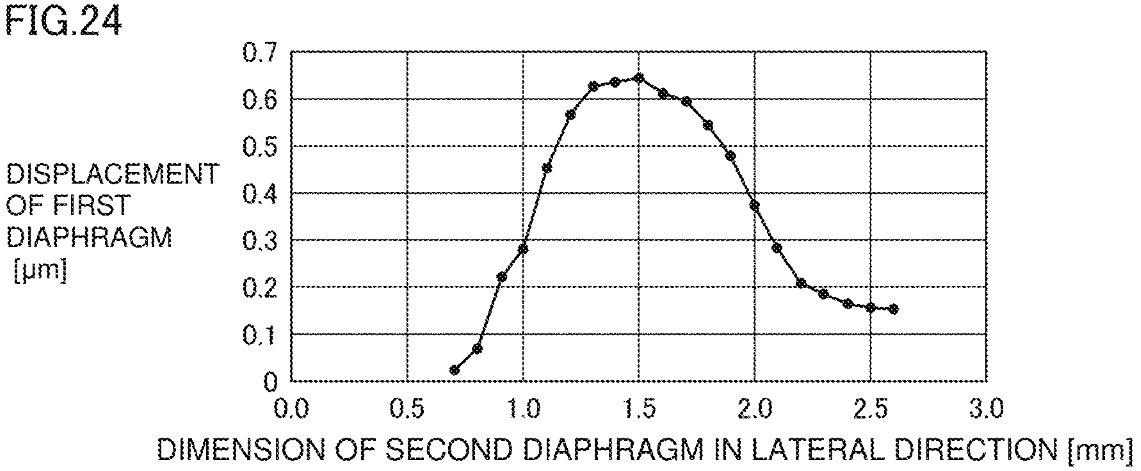
FIG. 24 is a graph illustrating changes in the displacement of the first diaphragm obtained by simulation analysis using a finite element method when the thickness of the second diaphragm in the analysis conditions of the first experimental example was changed to about 0.3 mm, and the lateral dimension W of the second diaphragm was changed with the middle position of the second diaphragm in the first direction (X-axis direction) fixed in a third experimental example.

FIG. 24 is a graph illustrating changes in the displacement of the first diaphragm obtained by simulation analysis using a finite element method when the thickness of the second diaphragm in the analysis conditions of the first experimental example was changed, for example, to about 0.3 mm, and the lateral dimension W of the second diaphragm was changed with the middle position of the second diaphragm in the first direction (X-axis direction) fixed in a third experimental example.

As illustrated in FIG. 24, for example, in the third experimental example, when the lateral dimension W of the second diaphragm in the first direction (X-axis direction) was about 1.2 mm or more and about 1.8 mm or less, that is, when the average distance D1 and the average distance D2 were about 0 mm or more and about 0.3 mm or less, the displacement of the first diaphragm 110 could be ensured at a high level of about 0.55 μm or more when the resonant frequency fell within the range of about 150 kHz to about 160 kHz, and the transmitted acoustic pressure and the receiving sensitivity of the ultrasonic transducer 100 could be increased.

Figure 25:
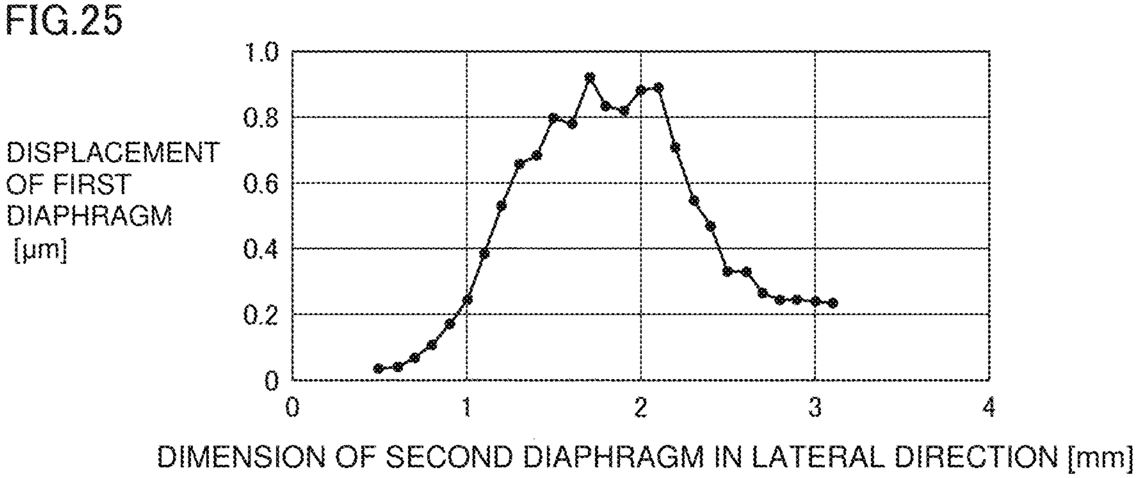
FIG. 25 is a graph illustrating changes in the displacement of the first diaphragm obtained by simulation analysis using a finite element method when the lateral dimension inside the frame body in the analysis conditions of the first experimental example was changed to about 2.2 mm, and the lateral dimension W of the second diaphragm was changed with the middle position of the second diaphragm in the first direction (X-axis direction) fixed in a fourth experimental example.

FIG. 25 is a graph illustrating changes in the displacement of the first diaphragm obtained by simulation analysis using a finite element method when the lateral dimension inside the frame body in the analysis conditions of the first experimental example was changed to, for example, about 2.2 mm, and the lateral dimension W of the second diaphragm was changed with the middle position of the second diaphragm in the first direction (X-axis direction) fixed in a fourth experimental example.

As illustrated in FIG. 25, in the fourth experimental example, for example, when the lateral dimension W of the second diaphragm in the first direction (X-axis direction) was about 1.6 mm or more and about 2.2 mm or less, that is, when the average distance D1 and the average distance D2 were about 0 mm or more and about 0.3 mm or less, the displacement of the first diaphragm 110 could be ensured at a high level of about 0.65 μm or more when the resonant frequency fell within the range of about 100 kHz to about 110 kHz, and the transmitted acoustic pressure and the receiving sensitivity of the ultrasonic transducer 100 could be increased.

Figure 26:
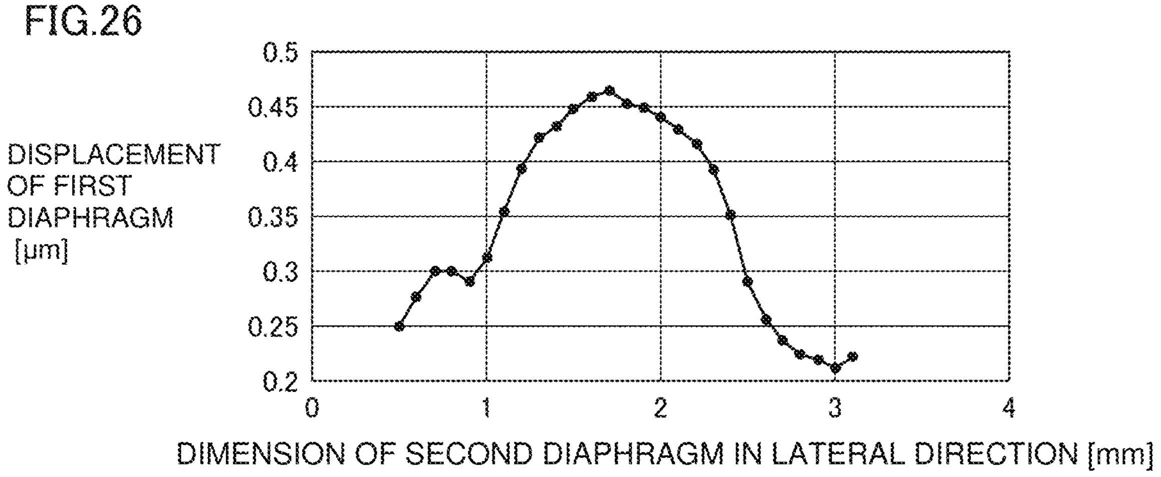
FIG. 26 is a graph illustrating changes in the displacement of the first diaphragm obtained by simulation analysis using a finite element method when the thickness of the piezoelectric body in the analysis conditions of the first experimental example was changed to about 0.2 mm, the lateral dimension inside the frame body was changed to about 2.2 mm, and the lateral dimension W of the second diaphragm was changed with the middle position of the second diaphragm in the first direction (X-axis direction) fixed in a fifth experimental example.

FIG. 26 is a graph illustrating changes in the displacement of the first diaphragm obtained by simulation analysis using a finite element method when the thickness of the piezoelectric body in the analysis conditions of the first experimental example was changed to, for example, about 0.2 mm, the lateral dimension inside the frame body was changed to about 2.2 mm, and the lateral dimension W of the second diaphragm was changed with the middle position of the second diaphragm in the first direction (X-axis direction) fixed in a fifth experimental example.

As illustrated in FIG. 26, in the fifth experimental example, for example, when the lateral dimension W of the second diaphragm in the first direction (X-axis direction) was about 1.6 mm or more and about 2.2 mm or less, that is, when the average distance D1 and the average distance D2 were about 0 mm or more and about 0.3 mm or less, the displacement of the first diaphragm 110 could be ensured at a high level of about 0.44 μm at a resonant frequency of 108 kHz, and the transmitted acoustic pressure and the receiving sensitivity of the ultrasonic transducer 100 could be increased.

Figure 27:
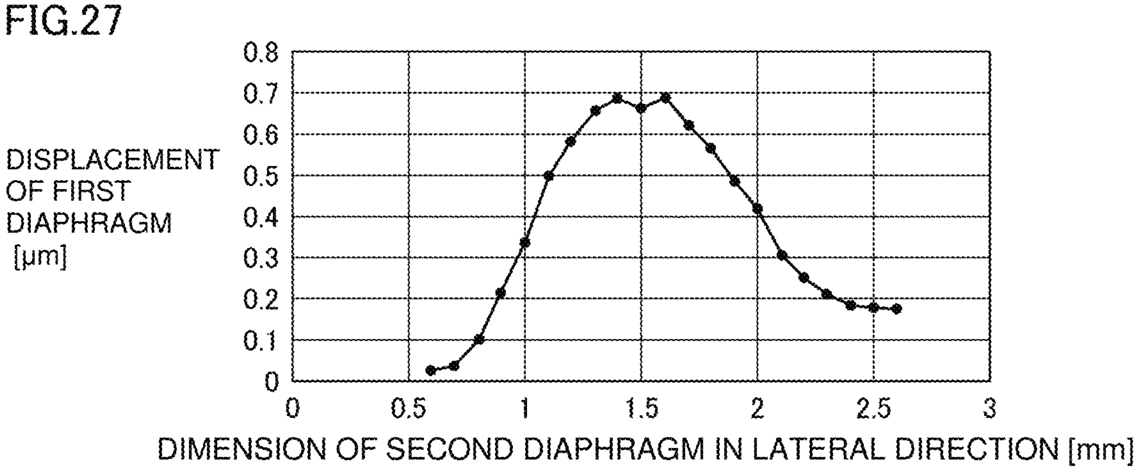
FIG. 27 is a graph illustrating changes in the displacement of the first diaphragm obtained by simulation analysis using a finite element method when the material of the second diaphragm in the analysis conditions of the first experimental example was changed to a piezoelectric ceramic, and the lateral dimension W of the second diaphragm was changed with the middle position of the second diaphragm in the first direction (X-axis direction) fixed in a sixth experimental example.

FIG. 27 is a graph illustrating changes in the displacement of the first diaphragm obtained by simulation analysis using a finite element method when the material of the second diaphragm in the analysis conditions of the first experimental example was changed to a piezoelectric ceramic, and the lateral dimension W of the second diaphragm was changed with the middle position of the second diaphragm in the first direction (X-axis direction) fixed in a sixth experimental example.

As illustrated in FIG. 27, for example, in the sixth experimental example, when the lateral dimension W of the second diaphragm in the first direction (X-axis direction) was about 1.2 mm or more and about 1.8 mm or less, that is, when the average distance D1 and the average distance D2 were about 0 mm or more and about 0.3 mm or less, the displacement of the first diaphragm 110 could be ensured at a high level of about 0.55 μm when the resonant frequency fell within the range of about 150 kHz to about 160 kHz, and the transmitted acoustic pressure and the receiving sensitivity of the ultrasonic transducer 100 could be increased.

Next, the following will describe the results of a seventh experimental example in which changes in the displacement of the first diaphragm was obtained by simulation analysis using a finite element method when the lateral dimension W of the second diaphragm was changed with the middle position of the second diaphragm in the first direction (X-axis direction) shifted.

Figure 28:
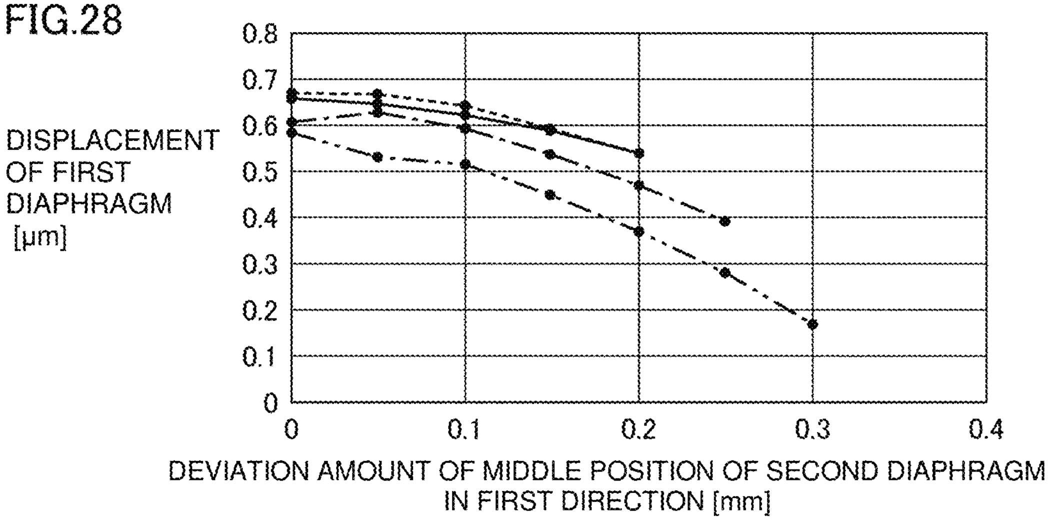
FIG. 28 is a graph illustrating changes in the displacement of the first diaphragm obtained by simulation analysis using a finite element method when the middle position of the second diaphragm in the first direction (X-axis direction) was shifted in a seventh experimental example.

FIG. 28 is a graph illustrating changes in the displacement of the first diaphragm obtained by simulation analysis using a finite element method when the middle position of the second diaphragm in the first direction (X-axis direction)

was shifted in the seventh experimental example. In FIG. 28, the vertical axis represents the displacement (μm) of the first diaphragm 110, and the horizontal axis represents the shift amount (mm) of the middle position of the second diaphragm in the first direction (X-axis direction). In FIG. 28, for example, the data when the lateral dimension W of the second diaphragm is about 1.5 mm is indicated by a solid line, the data for about 1.4 mm is indicated by a dotted line, the data for about 1.3 mm is indicated by a dot-dash line, and the data for about 1.2 mm is indicated by a dot-dot-dash line.

In the conditions of simulation analysis of the seventh experimental example, the other conditions were the same or substantially the same as those of the first experimental example. In addition, the direction in which the middle position of the second diaphragm was shifted was the positive or negative first direction (X-axis direction), and the middle position of the second diaphragm was shifted until the average distance D1 became about 0 mm.

Figure 29:
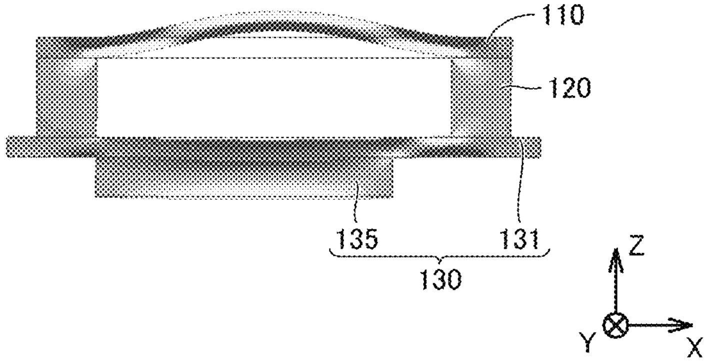
FIG. 29 is a sectional view illustrating the displacement state obtained by simulation analysis using a finite element method when an ultrasonic transducer according to a ninth example of example embodiment 1 of the present invention, in which the lateral dimension of the second diaphragm in the first direction (X-axis direction) was about 1.5 mm, the shift amount of the middle position in the first direction (X-axis direction) was about 0.15 mm, the average distance D1 was about 0 mm, and the average distance D2 was about 0.3 mm, was transmitting or receiving ultrasonic waves in the seventh experimental example.

FIG. 29 is a sectional view illustrating the displacement state obtained by simulation analysis using a finite element method when an ultrasonic transducer according to a ninth example, for example, in which the lateral dimension W of the second diaphragm in the first direction (X-axis direction) was about 1.5 mm, the shift amount of the middle position of the second diaphragm in the first direction (X-axis direction) was about 0.15 mm, the average distance D1 was 0 mm, and the average distance D2 was about 0.3 mm, was transmitting or receiving ultrasonic waves in the seventh experimental example.

Figure 30:
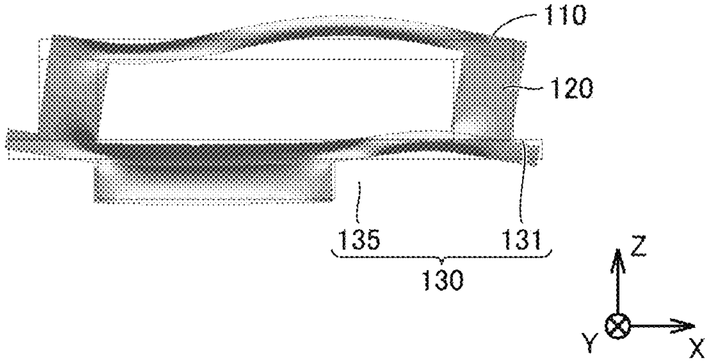
FIG. 30 is a sectional view illustrating the displacement state obtained by simulation analysis using a finite element method when an ultrasonic transducer according to a third comparative example, in which the lateral dimension W of the second diaphragm in the first direction (X-axis direction) was about 1.2 mm, the shift amount of the middle position in the first direction (X-axis direction) was about 0.3 mm, the average distance D1 was about 0 mm, and the average distance D2 was about 0.6 mm, was transmitting or receiving ultrasonic waves in the seventh experimental example.

FIG. 30 is a sectional view illustrating the displacement state obtained by simulation analysis using a finite element method when an ultrasonic transducer according to a third comparative example, for example, in which the lateral dimension W of the second diaphragm in the first direction (X-axis direction) was about 1.2 mm, the shift amount of the second diaphragm in the first direction (X-axis direction) was about 0.3 mm, the average distance D1 was about 0 mm, and the average distance D2 was about 0.6 mm, was transmitting or receiving ultrasonic waves in the seventh experimental example.

As illustrated in FIG. 28, in the seventh experimental example, for example, when the lateral dimension W of the second diaphragm in the first direction (X-axis direction) was about 1.2 mm, if the shift amount of the middle position of the second diaphragm in the first direction (X-axis direction) was about 0 mm, that is, if the average distance D1 and the average distance D2 were about 0.3 mm, the displacement of the first diaphragm 110 could be ensured at a high level of about 0.56 μm or more, and the transmitted acoustic pressure and the receiving sensitivity of the ultrasonic transducer 100 could be increased.

When the lateral dimension W of the second diaphragm in the first direction (X-axis direction) was about 1.3 mm, if the shift amount of the middle position of the second diaphragm in the first direction (X-axis direction) was about 0.1 mm or less, that is, if the average distance D2 was about 0.35 mm or less, the displacement of the first diaphragm 110 could be ensured at a high level of about 0.56 μm or more, and the transmitted acoustic pressure and the receiving sensitivity of the ultrasonic transducer 100 could be increased.

When the lateral dimension W of the second diaphragm in the first direction (X-axis direction) was about 1.4 mm, if the shift amount of the middle position of the second diaphragm in the first direction (X-axis direction) was about 0.15 mm or less, that is, if the average distance D2 was about 0.35 mm or less, the displacement of the first diaphragm 110 could be ensured at a high level of about 0.56 μm or more, and the transmitted acoustic pressure and the receiving sensitivity of the ultrasonic transducer 100 could be increased.

When the lateral dimension W of the second diaphragm in the first direction (X-axis direction) was about 1.5 mm, if the shift amount of the middle position of the second diaphragm in the first direction (X-axis direction) was about 0.15 mm or less, that is, if the average distance D2 was about 0.3 mm or less, the displacement of the first diaphragm 110 could be ensured at a high level of about 0.56 μm or more, and the transmitted acoustic pressure and the receiving sensitivity of the ultrasonic transducer 100 could be increased.

As illustrated in FIG. 29, when the average distance D2 was about 0.3 mm, high compressive stress occurred in a portion above the second diaphragm 135 in the stress distribution within the piezoelectric body 131, and high tensile stress occurred in a portion corresponding to the average distance D2, but the vibration mode is maintained and there is no significant decrease in the displacement of the first diaphragm 110.

As illustrated in FIG. 30, when the average distance D2 was about 0.6 mm, high compression stress occurred on a portion above the second diaphragm 135 in the stress distribution within the piezoelectric body 131, and high tensile stress occurred in a portion corresponding to the average distance D2, the first diaphragm 110 deformed into an uneven shape because the vibration mode changed, and a significant decrease in the displacement of the first diaphragm 110 could be found.

According to the operating mechanism illustrated in FIGS. 29 and 30, for example, it is thought that, when the middle position of the second diaphragm 135 in the first direction (X-axis direction) is shifted from the middle position of the inner space of the frame body 120 in the first direction (X-axis direction), if the average distance D1 and the average distance D2 are one sixth or less the lateral dimension L2 in the first direction (X-axis direction) inside the frame body 120, the displacement of the first diaphragm 110 can be ensured at a high level of about 0.56 μm or more, and the transmitted acoustic pressure and the receiving sensitivity of the ultrasonic transducer 100 can be increased.

Based on the results of the first to seventh experimental examples described above, it is thought that when the second diaphragm 135 is located in a region interposed, in the first direction (X-axis direction), between both edges in the first direction (X-axis direction) of the inner peripheral surface of the frame body 120 as viewed in the third direction (Z-axis direction) orthogonal or substantially orthogonal to the first diaphragm 110, and the average distance D1 in the first direction (X-axis direction) between one edge **120*s*1 in the first direction (X-axis direction) of the inner peripheral surface of the frame body 120 and one edge 135*s*1 in the first direction (X-axis direction) of the second diaphragm 135 and the average distance D2 in the first direction (X-axis direction) between the other edge 120*s*2 in the first direction (X-axis direction) of the inner peripheral surface of the frame body 120 and the other edge 135*s*2 in the first direction (X-axis direction) of the second diaphragm 135 are one sixth or less the lateral dimension L2 in the first direction (X-axis direction) inside the frame body 120 in the second diaphragm 135, the transmitted acoustic pressure and the receiving sensitivity of the ultrasonic transducer 100 can be increased by increasing the displacement of the first diaphragm 110**.

In a parametric speaker including the ultrasonic transducer 100 according to example embodiment 1 of the present invention, audible sound can be reproduced by modulating ultrasonic waves emitted from the ultrasonic transducer 100 by modulation driving of the ultrasonic transducer 100. There are two modulation methods: an amplitude modulation method (AM modulation method) and a frequency modulation method (FM modulation method).

Figure 31:
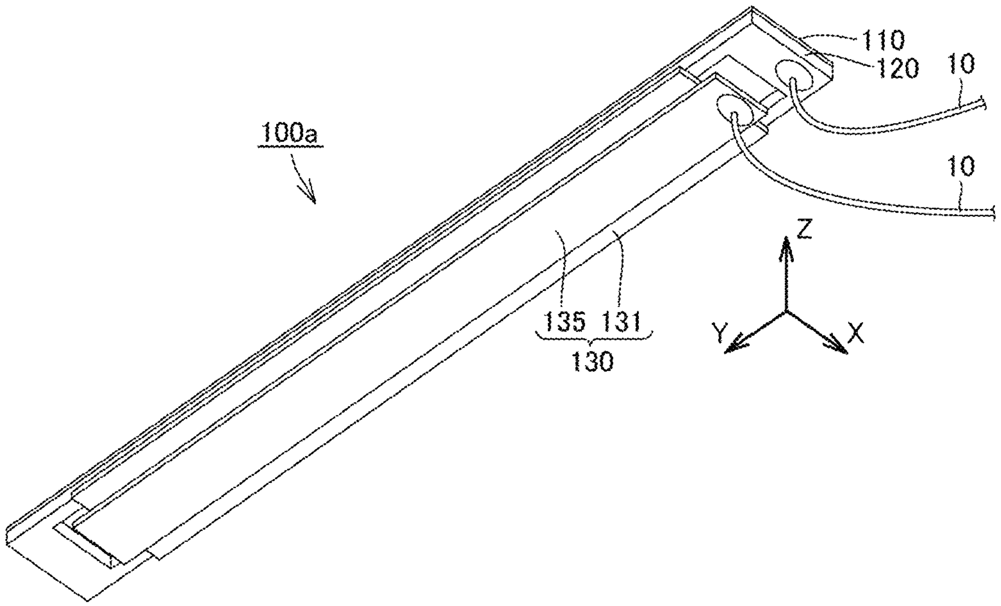
FIG. 31 is a perspective view of an ultrasonic transducer according to a first modification of example embodiment 1 of the present invention as viewed from the side of the second diaphragm.

FIG. 31 is a perspective view of an ultrasonic transducer according to a first modification of example embodiment 1 of the present invention as viewed from the side of the second diaphragm. As illustrated in FIG. 31, in an ultrasonic transducer 100*a* according to the first modification of example embodiment 1 of the present invention, the length of the second diaphragm 135 in the second direction (Y-axis direction) is greater than the length of the piezoelectric body 131 in the second direction (Y-axis direction). The frame body 120 and the second diaphragm 135 are plated with, for example, Ag. The frame body 120 and the piezoelectric body 131 are electrically connected to each other by pressure bonding, and the piezoelectric body 131 and the second diaphragm 135 are electrically connected to each other by pressure bonding. Accordingly, the wiring lines 10 to supply power to the piezoelectric body 131 can be easily connected to the end portions in the second direction (Y-axis direction) of the frame body 120 and the second diaphragm 135.

Figure 32:
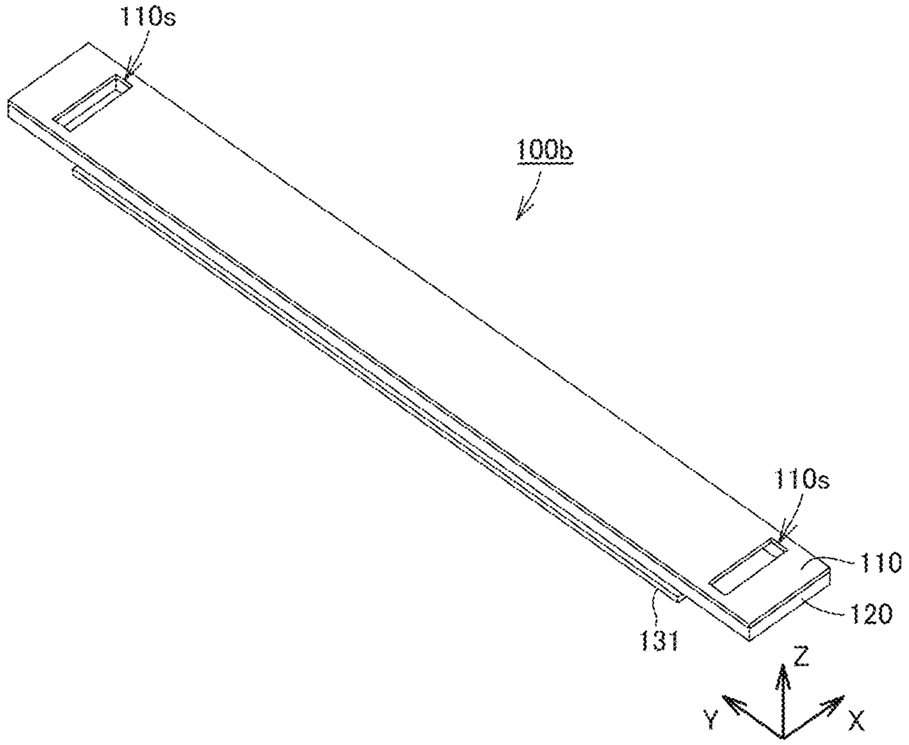
FIG. 32 is a perspective view of an ultrasonic transducer according to a second modification of example embodiment 1 of the present invention as viewed from the side of the first diaphragm.

FIG. 32 is a perspective view of an ultrasonic transducer according to a second modification of example embodiment 1 of the present invention as viewed from the side of the first diaphragm. As illustrated in FIG. 32, in an ultrasonic transducer 100*b* according to the second modification of example embodiment 1 of the present invention, slits 110*s* extending in the first direction (X-axis direction) are provided in the first diaphragm 110. In the present modification, the longitudinal dimension of the slits 110*s* in the first direction (X-axis direction) is the same or substantially the same to the lateral dimension L2 in the first direction (X-axis direction) inside the frame body 120. The width dimension of the slits 110*s* in the second direction (Y-axis direction) is, for example, about 0.4 mm or more and about 0.6 mm or less. The slits 110*s* are provided from the positions of the edges of the inner peripheral surface of the frame body 120 in the second direction (Y-axis direction) to the positions inside the width dimension described above in the second direction (Y-axis direction). The two slits 110*s* are opened at both end portions in the second direction (Y-axis direction) inside the frame body 120.

As a result, since the internal space inside the frame body 120 and the external space outside the frame body 120 communicate with each other through the slits 110*s*, it is possible to reduce the pressure change of the internal space when, for example, an adhesive that joins the first diaphragm 110 and the frame body 120 to each other is heated and solidified and reduced or prevents the internal stress in the ultrasonic transducer 100 from being increased. In addition, since portions adjacent to the slits 110*s* become free ends of the first diaphragm 110 that resonantly vibrates and are easily displaced, the internal stress generated within the first diaphragm 110 that resonantly vibrates can be reduced. Accordingly, in the ultrasonic transducer 100, the acoustic pressure level can be increased by the internal stress being reduced by the simple and small-sized structure.

Example Embodiment 2

An ultrasonic transducer according to example embodiment 2 of the present invention will be described with reference to the drawings. Since the ultrasonic transducer according to example embodiment 2 of the present invention differs from the ultrasonic transducer according to example embodiment 1 of the present invention in that a plurality of unimorph piezoelectric vibrators are provided in an array, the structure that is the same or substantially the same as that of the ultrasonic transducer according to example embodiment 1 of the present invention will not be described.

Figure 33:
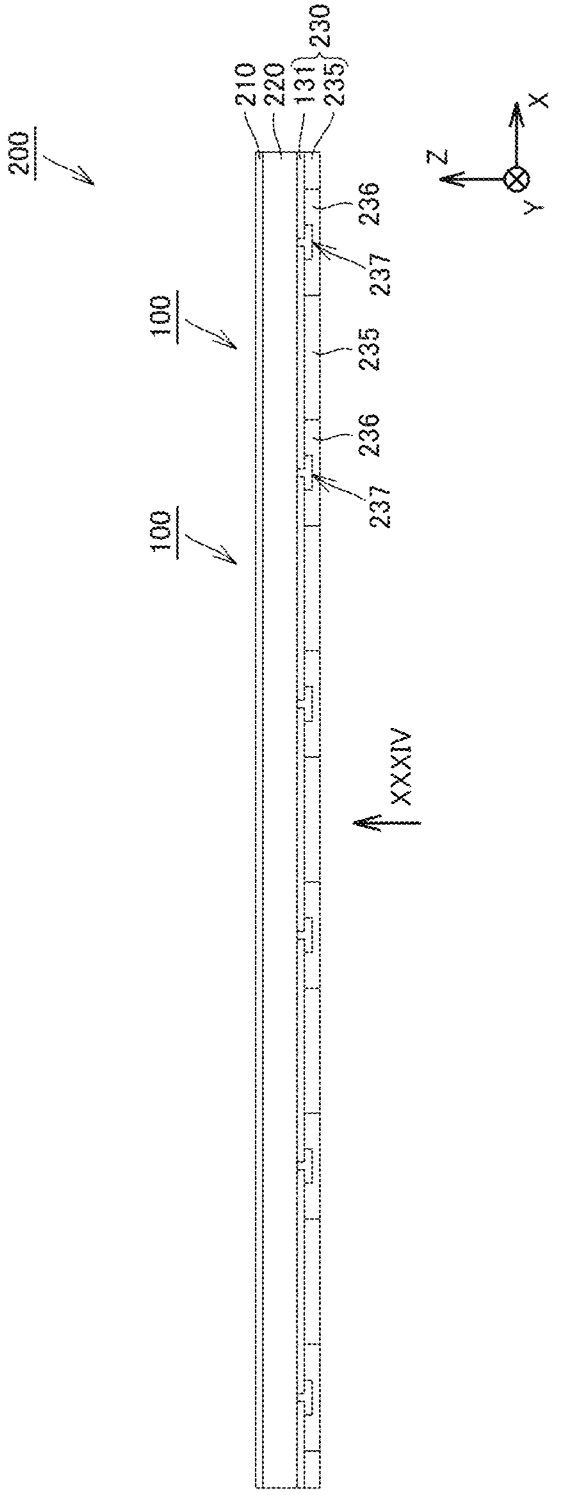
FIG. 33 is a side view illustrating the structure of an ultrasonic transducer according to example embodiment 2 of the present invention.
Figure 34:
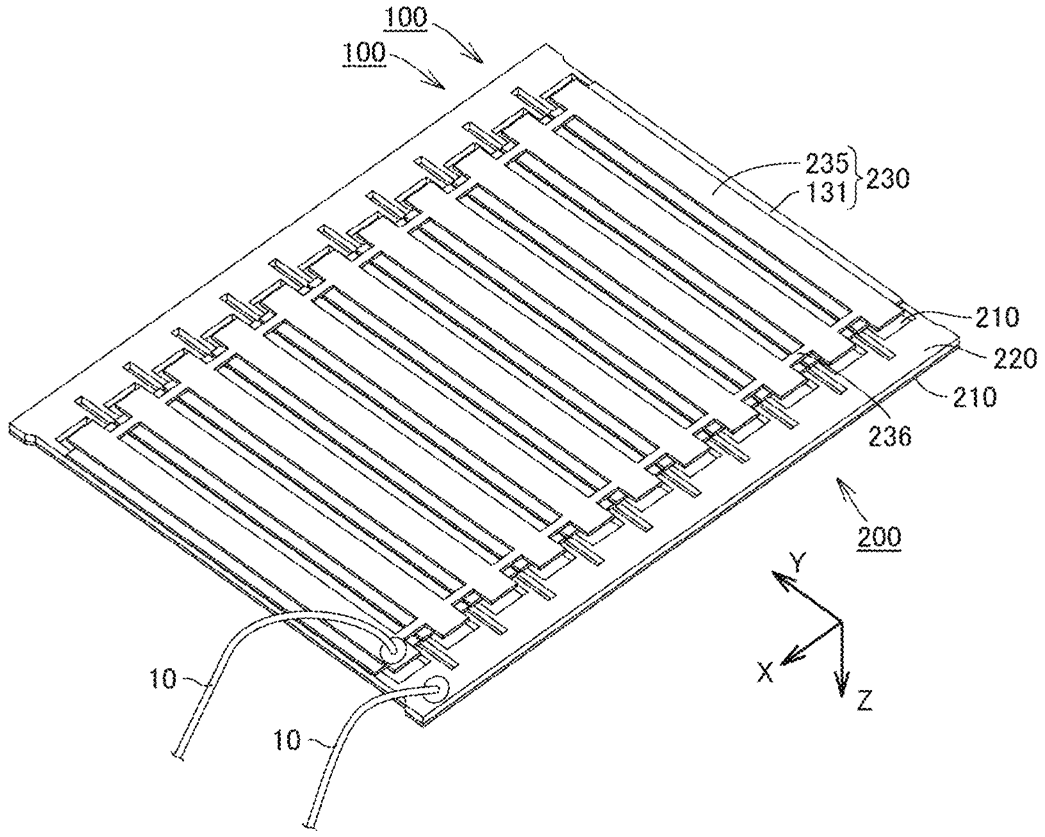
FIG. 34 is a back view of the ultrasonic transducer in FIG. 33 as viewed in the direction of arrow XXXIV.
Figure 35:
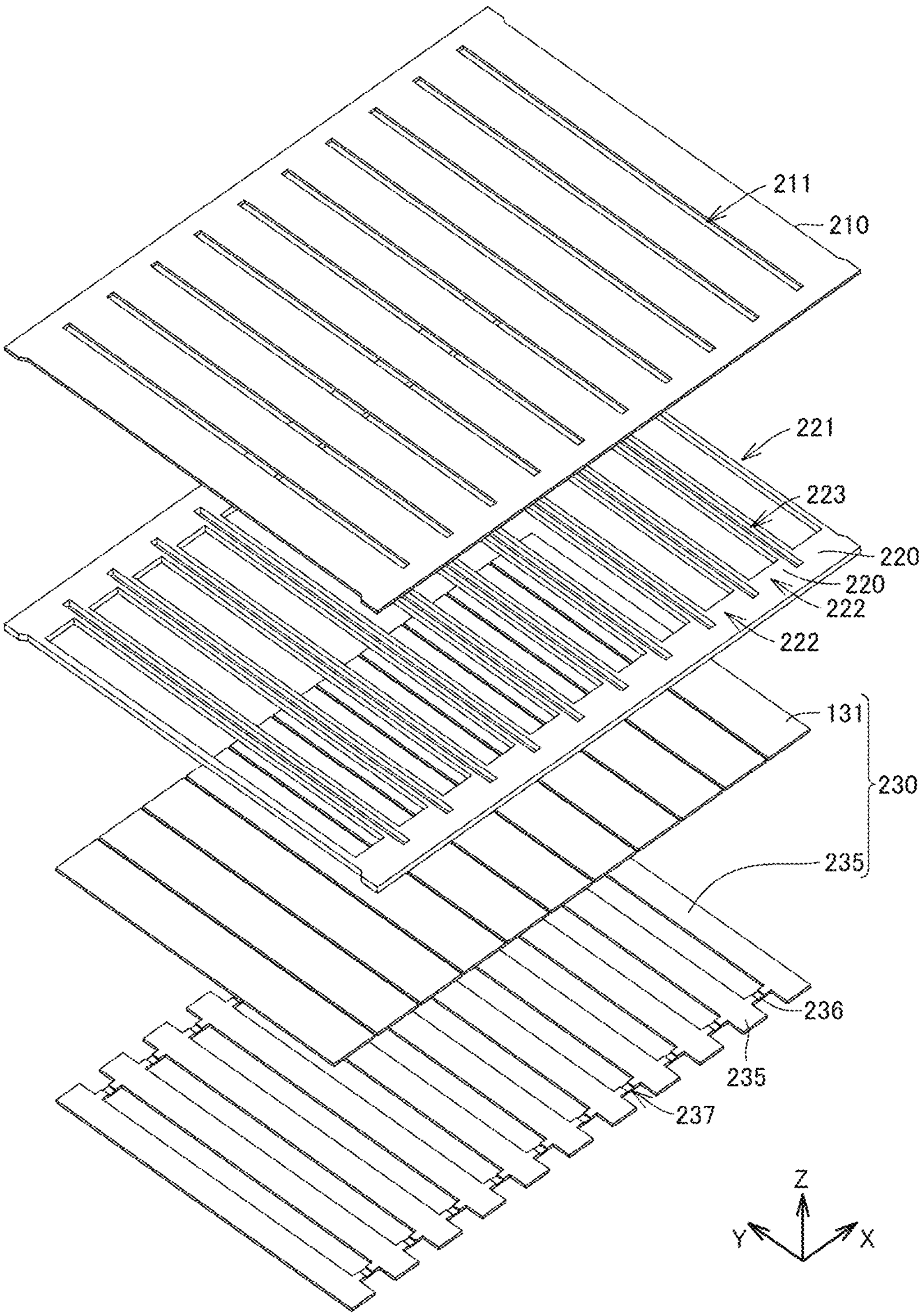
FIG. 35 is an exploded perspective view illustrating the laminated state of components of the ultrasonic transducer according to example embodiment 2 of the present invention.

FIG. 33 is a side view illustrating the structure of an ultrasonic transducer according to example embodiment 2 of the present invention. FIG. 34 is a back view of the ultrasonic transducer in FIG. 33 as viewed in the direction of arrow XXXIV. FIG. 35 is an exploded perspective view illustrating the laminated state of components of the ultrasonic transducer according to example embodiment 2 of the present invention.

As illustrated in FIGS. 33 to 35, in an ultrasonic transducer 200 according to example embodiment 2 of the present invention, the ultrasonic transducers 100 according to example embodiment 1 provided in an array in the first direction (X-axis direction) are integrally provided. The ultrasonic transducer 200 includes a first diaphragm 210, a plurality of frame bodies 220, and a plurality of unimorph piezoelectric vibrators 230. The plurality of frame bodies 220 are joined to the first diaphragm 210, and the plurality of unimorph piezoelectric vibrators 230 are joined to the plurality of frame bodies 220, respectively.

Here, an example of a method of manufacturing the ultrasonic transducer 200 will be described. As illustrated in FIG. 35, the first diaphragm 210 has a flat shape, and a plurality of slits 211 extending in the second direction (Y-axis direction) are formed at intervals in the first direction (X-axis direction). The first diaphragm 210 is made of, for example, a metal, which is an aluminum alloy, such as duralumin containing aluminum, or a stainless steel. In the present example embodiment, the first diaphragm 210 is made of a stainless steel. The plurality of slits 211 are formed by, for example, etching, cutting, or the like.

The plurality of frame bodies 220 have a rectangular or substantially rectangular track shape. The plurality of frame bodies 220 have a lateral direction along the first direction (X-axis direction) and a longitudinal direction along the second direction (Y-axis direction). The plurality of frame bodies 220 extend in the second direction (Y-axis direction). The axis directions of the plurality of frame bodies 220 are along the third direction (Z-axis direction). Each of the plurality of frame bodies 220 includes a pair of long-side portions 221 extending in the second direction (Y-axis direction) and a pair of short-side portions 222 extending in the first direction (X-axis direction). The shortest distance between the long-side portions 221 is four or more times the shortest distance between the short-side portions 222.

The plurality of frame bodies 220 are arranged in the first direction (X-axis direction). Each of slits 223 is formed between each pair of frame bodies 220 adjacent to each other in the first direction (X-axis direction). The plurality of slits 223 are formed by etching, cutting, or the like. The adjacent long-side portions 221 of the frame bodies 220 adjacent to each other in the first direction (X-axis direction) are separated from each other by the slits 223.

The frame bodies 220 adjacent to each other in the first direction (X-axis direction) are connected to each other by the short-side portions 222. That is, each pair of frame bodies 220 adjacent to each other in the lateral direction of the plurality of frame bodies 220 is connected to each other by both end portions in the longitudinal direction.

The plurality of frame bodies 220 are formed of, for example, a glass epoxy, a resin, or a metal, such as an aluminum alloy or a stainless steel.

The plurality of frame bodies 220 are formed of a single thin plate in the present example embodiment, but the present invention is not limited to the present example embodiment, and the short-side portions 222 of the plurality of frame bodies 220 formed of a plurality of thin plates may be integrated with each other by being joined to each other.

Figure 36:
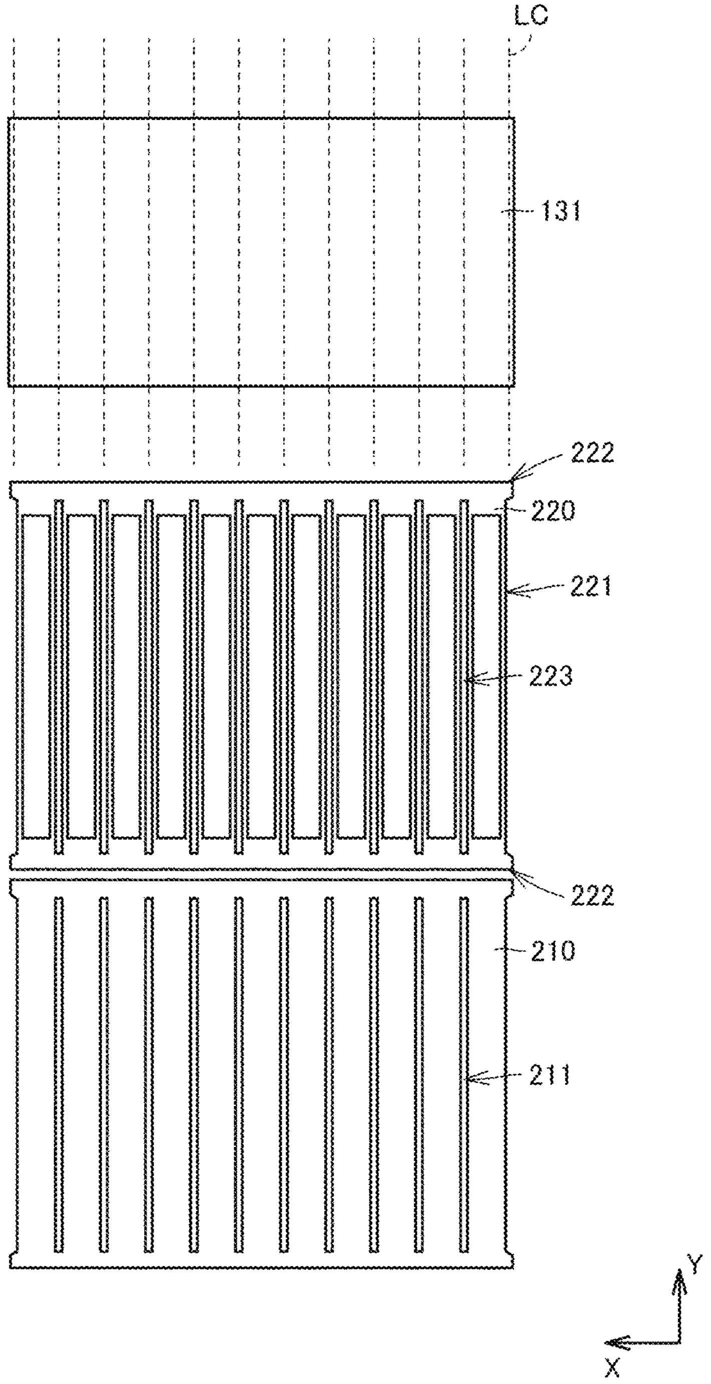
FIG. 36 is a plan view illustrating a positional relationship in the first direction (X-axis direction) in a process of cutting the piezoelectric body of the ultrasonic transducer according to example embodiment 2 of the present invention.

FIG. 36 is a plan view illustrating the positional relationship in the first direction (X-axis direction) in the process of cutting the piezoelectric body of the ultrasonic transducer according to example embodiment 2 of the present invention. As illustrated in FIG. 36, the slits 211 and the slits 223 are disposed at the same or substantially the same positions in the first direction (X-axis direction) so as to overlap each other in the third direction (Z-axis direction). The piezoelectric body 131 is cut and divided by a dicer or the like along a plurality of cut lines LC extending in the second direction (Y-axis direction) such that the slits 211 and the slits 223 overlap each other in the third direction (Z-axis direction).

As illustrated in FIG. 35, each pair of second diaphragms 235 adjacent to each other in the first direction (X-axis direction) is connected by junction portions 236 at positions near both end portions in the second direction (Y-axis direction). The junction portions 236 extend in the first direction (X-axis direction). The junction portions 236 are formed by, for example, etching, pressing, cutting, or the like.

Recessed portions 237 are formed so as to face the gaps between the piezoelectric bodies 131 adjacent to each other in the first direction (X-axis direction) in the plurality of unimorph piezoelectric vibrators 230 in the junction portion 236. The recessed portions 237 are formed by, for example, half-etching, pressing, cutting, or the like.

The second diaphragms 235 are joined to the piezoelectric bodies 131 with an adhesive such that the recessed portions 237 face the cut lines LC in the third direction (Z-axis direction). As a result, as illustrated in FIG. 34, each of the plurality of unimorph piezoelectric vibrators 230 includes the piezoelectric body 131 facing the first diaphragm 210 with a space therebetween and each of the plurality of second diaphragms 235 provided on an opposite side of the piezoelectric body 131 from the frame body 220. The plurality of unimorph piezoelectric vibrators 230 are arranged in the first direction (X-axis direction).

The recessed portions 237 define and function as reservoirs for the adhesive and reduce or prevent the cut lines LC from being filled with the adhesive. As a result, the characteristics of the ultrasonic transducer 200 from degrading because the adjacent unimorph piezoelectric vibrators 230 interfere with each other.

In the present example embodiment, the frame bodies 220 and the second diaphragms 235 are plated with, for example, Ag or the like. The frame bodies 220 and the piezoelectric bodies 131 are electrically connected to each other by, for example, pressure bonding, and the piezoelectric bodies 131 and the second diaphragms 235 are also electrically connected to each other by pressure bonding. As a result, the plurality of unimorph piezoelectric vibrators 230 can be driven by connecting the wiring lines 10 to supply power to the piezoelectric bodies 131 to only two portions at the end portions in the second direction (Y-axis direction) of the frame bodies 220 and the second diaphragms 235 as illustrated in FIG. 34.

Since the ultrasonic transducer 100 according to example embodiment 1 includes node points at both end portions in the second direction (Y-axis direction), which is the longitudinal direction, even when the ultrasonic transducer 200 according to example embodiment 2 is formed by the ultrasonic transducers 100 according to example embodiment 1 being connected to each other at both end portions and arrayed, the resonant vibration of the ultrasonic transducers 100 is not inhibited. Accordingly, the acoustic pressure level can be easily increased by increasing the number of ultrasonic transducers 100 that define the ultrasonic transducer 200 according to example embodiment 2.

In a parametric speaker including the ultrasonic transducer 200 according to example embodiment 2 of the present invention, audible sound can be reproduced by modulating ultrasonic waves emitted from the ultrasonic transducer 200 by modulation driving of the ultrasonic transducer 200.

In the parametric speaker including the ultrasonic transducer 200 according to the present example embodiment that transmits ultrasonic waves with a high frequency of, for example, about 100 kHz or more, audible sound can be reproduced only within a limited space by reducing or preventing sound from reaching an unnecessarily far position and sound from leaking due to unnecessary reflection. In addition, since the ultrasonic transducer 200 can increase the attenuation of audible sound due to the propagation distance without a structure for transmitting carrier waves in an opposite phase as in Japanese Patent No. 6333480 being provided, a simplified and small-sized structure can be achieved. Furthermore, ultrasonic waves with a high frequency of, for example, about 100 kHz or more are outside the audible range of animals, such as dogs or cats, effects on these animals can be reduced or prevented.

The Rayleigh distance needs to be, for example, about 30 cm or less to attenuate audible sound at a propagation distance of about 30 cm or more. A Rayleigh distance R0 satisfies the relationship $R0=(k\times a^2)/2$ where k is the number of waves and a is the radius of a sound source. Accordingly, when the acoustic velocity of air is, for example, about 340 m/s, if the frequency of ultrasonic waves is about 100 kHz, the longitudinal dimension of the vibrational region of the first diaphragm 210 is about 36 mm or less. If the frequency of ultrasonic waves is, for example, about 150 kHz, the longitudinal dimension of the vibrational region of the first diaphragm 210 is about 29.4 mm or less. If the frequency of ultrasonic waves is about 200 kHz, the longitudinal dimension of the vibrational region of the first diaphragm 210 is about 25.5 mm or less. If the frequency of ultrasonic waves is 100 kHz or higher, the longitudinal dimension L1 is about four or more times and 24 or less times the lateral dimension L2.

In the description of the example embodiments and examples described above, combinable structures may be combined with each other.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic transducer comprising:

a first diaphragm;

at least one frame body extending in a longitudinal direction and joined to the first diaphragm; and at least one unimorph piezoelectric vibrator, attached to the at least one frame body, and including a piezoelectric body facing the first diaphragm with a space therebetween and a second diaphragm provided on an opposite side of the piezoelectric body from the frame body; wherein the first diaphragm is configured to resonantly vibrate in a phase opposite to a phase of the at least one unimorph piezoelectric vibrator in a direction orthogonal or substantially orthogonal to the first diaphragm;

a dimension in the longitudinal direction inside the at least one frame body is about four or more times a dimension in a lateral direction orthogonal or substantially orthogonal to the longitudinal direction inside the at least one frame body; and the second diaphragm is located in a region interposed, in the lateral direction, between both edges in the lateral direction of an inner peripheral surface of the at least one frame body as viewed in the direction orthogonal or substantially orthogonal to the first diaphragm, and an average distance in the lateral direction between one of the edges in the lateral direction of the inner peripheral surface of the at least one frame body and one of edges in the lateral direction of the second diaphragm and an average distance in the lateral direction between another of the edges in the lateral direction of the inner peripheral surface of the at least one frame body and another of the edges in the lateral direction of the second diaphragm are one sixth or less the dimension in the lateral direction inside the at least one frame body.

2. The ultrasonic transducer according to claim 1, wherein the dimension in the longitudinal direction inside the at least one frame body is greater than a minimum dimension of the piezoelectric body of the at least one unimorph piezoelectric vibrator in the longitudinal direction; and an average distance in the longitudinal direction of a gap between at least one of edges in the longitudinal direction of the inner peripheral surface of the at least one frame body and at least one of edges in the longitudinal direction of a surface of the piezoelectric body of the at least one unimorph piezoelectric vibrator closer to the frame body is about 1.3 or less times the dimension in the lateral direction inside the at least one frame body.

3. The ultrasonic transducer according to claim 1, wherein the at least one frame body includes a plurality of frame bodies, and the plurality of frame bodies are arranged in the lateral direction and joined to the first diaphragm;

frame bodies adjacent to each other of the plurality of frame bodies are connected to each other at both end portions in the longitudinal direction of the plurality of frame bodies; and the at least one unimorph piezoelectric vibrator includes a plurality of unimorph piezoelectric vibrators, and the plurality of unimorph piezoelectric vibrators are arranged in the lateral direction.

4. The ultrasonic transducer according to claim 3, wherein second diaphragms adjacent to each other in the lateral direction of the at least one unimorph piezoelectric vibrator are connected to each other by a junction portion extending in the lateral direction at positions closer to both end portions in the longitudinal direction of the second diaphragms, the second diaphragm being one of the second diaphragms; and a recessed portion is provided in a portion facing a gap between the piezoelectric bodies adjacent to each other in the lateral direction of the at least one unimorph piezoelectric vibrator in the junction portion.

5. The ultrasonic transducer according to claim 1, wherein the first diaphragm has a flat shape.

6. The ultrasonic transducer according to claim 1, wherein the first diaphragm includes duralumin including aluminum or a stainless steel.

7. The ultrasonic transducer according to claim 1, wherein a thickness of the first diaphragm is about 0.05 mm or more and about 0.2 mm or less.

8. The ultrasonic transducer according to claim 1, wherein the at least one frame body includes glass epoxy, resin, an aluminum alloy, an iron-nickel alloy, or stainless steel.

9. The ultrasonic transducer according to claim 1, wherein a thickness of the at least one frame body is about 0.2 mm or more and about 0.6 mm or less.

10. The ultrasonic transducer according to claim 1, wherein a thickness of the piezoelectric body is about 0.1 mm or more and about 0.2 mm or less.

11. A parametric speaker comprising:

the ultrasonic transducer according to claim 1; wherein audible sound is reproduced by modulation driving of the ultrasonic transducer.

12. The parametric speaker according to claim 11, wherein the dimension in the longitudinal direction inside the at least one frame body is greater than a minimum dimension of the piezoelectric body of the at least one unimorph piezoelectric vibrator in the longitudinal direction; and an average distance in the longitudinal direction of a gap between at least one of edges in the longitudinal direction of the inner peripheral surface of the at least one frame body and at least one of edges in the longitudinal direction of a surface of the piezoelectric body of the at least one unimorph piezoelectric vibrator closer to the frame body is about 1.3 or less times the dimension in the lateral direction inside the at least one frame body.

13. The parametric speaker according to claim 11, wherein the at least one frame body includes a plurality of frame bodies, and the plurality of frame bodies are arranged in the lateral direction and joined to the first diaphragm;

frame bodies adjacent to each other of the plurality of frame bodies are connected to each other at both end portions in the longitudinal direction of the plurality of frame bodies; and the at least one unimorph piezoelectric vibrator includes a plurality of unimorph piezoelectric vibrators, and the plurality of unimorph piezoelectric vibrators are arranged in the lateral direction.

14. The parametric speaker according to claim 13, wherein second diaphragms adjacent to each other in the lateral direction of the at least one unimorph piezoelectric vibrator are connected to each other by a junction portion extending in the lateral direction at positions closer to both end portions in the longitudinal direction of the second diaphragms, the second diaphragm being one of the second diaphragms; and a recessed portion is provided in a portion facing a gap between the piezoelectric bodies adjacent to each other in the lateral direction of the at least one unimorph piezoelectric vibrator in the junction portion.

15. The parametric speaker according to claim 11, wherein the first diaphragm has a flat shape.

16. The parametric speaker according to claim 11, wherein the first diaphragm includes duralumin including aluminum or a stainless steel.

17. The parametric speaker according to claim 11, wherein a thickness of the first diaphragm is about 0.05 mm or more and about 0.2 mm or less.

18. The parametric speaker according to claim 11, wherein the at least one frame body includes glass epoxy, resin, an aluminum alloy, an iron-nickel alloy, or stainless steel.

19. The parametric speaker according to claim 11, wherein a thickness of the at least one frame body is about 0.2 mm or more and about 0.6 mm or less.

20. The parametric speaker according to claim 11, wherein a thickness of the piezoelectric body is about 0.1 mm or more and about 0.2 mm or less.

* * * * *